US011017001B2

(12) United States Patent
Newell et al.

(10) Patent No.: US 11,017,001 B2
(45) Date of Patent: May 25, 2021

(54) APPARATUS, SYSTEMS AND METHODS FOR PROVIDING CONVERSATIONAL ASSISTANCE

(71) Applicant: DISH Network L.L.C., Englewood, CO (US)

(72) Inventors: Nicholas Newell, Centennial, CO (US); Swapnil Tilaye, Broomfield, CO (US)

(73) Assignee: DISH Network L.L.C., Englewood, CO (US)

( * ) Notice: Subject to any disclaimer, the term of this patent is extended or adjusted under 35 U.S.C. 154(b) by 215 days.

(21) Appl. No.: 16/237,126

(22) Filed: Dec. 31, 2018

(65) Prior Publication Data

US 2020/0210464 A1    Jul. 2, 2020

(51) Int. Cl.
*G06F 16/332* (2019.01)
*G10L 15/22* (2006.01)
*G06F 16/338* (2019.01)
*G10L 15/18* (2013.01)

(52) U.S. Cl.
CPC ........ *G06F 16/3329* (2019.01); *G06F 16/338* (2019.01); *G10L 15/1822* (2013.01); *G10L 15/22* (2013.01); *G10L 2015/225* (2013.01)

(58) Field of Classification Search
None
See application file for complete search history.

(56) References Cited

U.S. PATENT DOCUMENTS

| 9,467,718 | B1 | 10/2016 | Newell et al. | |
|---|---|---|---|---|
| 2018/0211659 | A1* | 7/2018 | Segal | G06F 3/167 |
| 2020/0043479 | A1* | 2/2020 | Mont-Reynaud | G06F 40/30 |

* cited by examiner

*Primary Examiner* — Nafiz E Hoque
(74) *Attorney, Agent, or Firm* — Perkins Coie LLP

(57) ABSTRACT

Conversation support systems and methods are operable to assist a user to more fully participate in an ongoing conversation. An exemplary embodiment receives a conversation map comprising a serially arranged plurality of conversation segments of audio information each associated with one of a plurality of conversation participants, and that includes dialogue of the ongoing conversation being spoken by the associated conversation participant; determining subject matter of a current portion of the ongoing conversation based on the dialogue; selects conversation support information that pertains to the current conversation subject; and generating a conversation queue that includes information that corresponds to the selected conversation support information, wherein the conversation queue is communicated from the conversational support system to at least one conversation queue output device that presents the conversation support information to the user.

19 Claims, 4 Drawing Sheets

# APPARATUS, SYSTEMS AND METHODS FOR PROVIDING CONVERSATIONAL ASSISTANCE

BACKGROUND

Consumer participation, by certain individual community members, on a social TV and movie platform may be low. The participation by such community members may be low at first because such community members may just want to sit back, relax, and be entertained by activities occurring on the social platform. Generically, such community members may be referred to as "wallflowers." Wallflowers are community members who are typically shy and are often personally discouraged from voicing, or at least reluctant to voice, their opinion in public. Accordingly, forcing a wallflower to speak in a group setting or on camera results in feedback and/or commentary from the wallflower that is neither genuine nor natural.

Television (TV) content, music and movies, interchangeably referred to herein as a media content event, may provide a healthy escape for a viewing individual. However, current content delivery and content discovery methods are driving people farther and farther apart from one another since consumption of TV content and/or movies is often done in the privacy of their home and/or on their personal entertainment devices. Private consumption of content does not encourage desirable human connection that would otherwise happen in a more public environment.

Accordingly, there is a need in the arts to facilitate and encourage interactions between individuals who are participating in a social interaction event. Here, a social interaction event is defined as an event wherein a plurality of individuals are engaging with each other during the event. The social interaction event may be attended in person by the participants, and/or may be virtually attended by a participant via an electronic-based communication system.

The social interaction event may be undertaken by the participating individuals for any suitable purpose. For example, the individuals may be having a conversation to discuss some topic of interest. An example topic of interest may be a commonly viewed (i.e., "consumed") media content event, such as a TV show, a serial program, or a movie. Or, the topic may pertain to a real life event, such as a sporting event, a concert, a political or world event, or the like. Another example of a real life social interaction event may be a dinner party or other social function.

A wallflower may not be fully participating in an ongoing social interaction event. However, the wallflower could benefit from encouragement to more fully participate in the ongoing social interaction event. By enhancing the wallflower's ability to more fully participate and engage in an ongoing social interaction event, the individual will obtain a higher quality and more enjoyable experience from their participation in the social interaction event.

Other individuals who have various difficulties and/or disabilities may also benefit from encouragement and support while they are in participating in social interaction events. For example, but not limited to, a child with a disability may experience difficulties while engaging with other children while at school, playing on a playground, or participating in a game. An adult with a disability of some type who is at a dinner party or is in a public place, such as a bar or a restaurant, may have difficulty participating in an ongoing conversation (a social interaction event) with the other conversation participants.

Accordingly, there is a need in the arts to facilitate an individual's participation in a social event and/or to facilitate the individual's interaction with other participants in the social event.

SUMMARY

Conversation support systems and methods are disclosed that are operable to assist a user to more fully participate in an ongoing conversation. An exemplary embodiment receives a conversation map comprising a serially arranged plurality of conversation segments of audio information each associated with one of a plurality of conversation participants, and that includes dialogue of the ongoing conversation being spoken by the associated conversation participant; determining subject matter of a current portion of the ongoing conversation based on the dialogue; selects conversation support information that pertains to the current conversation subject; and generating a conversation queue that includes information that corresponds to the selected conversation support information, wherein the conversation queue is communicated from the conversational support system to at least one conversation queue output device that presents the conversation support information to the user.

BRIEF DESCRIPTION OF THE DRAWINGS

Preferred and alternative embodiments are described in detail below with reference to the following drawings.

DETAILED DESCRIPTION

Figure 1:
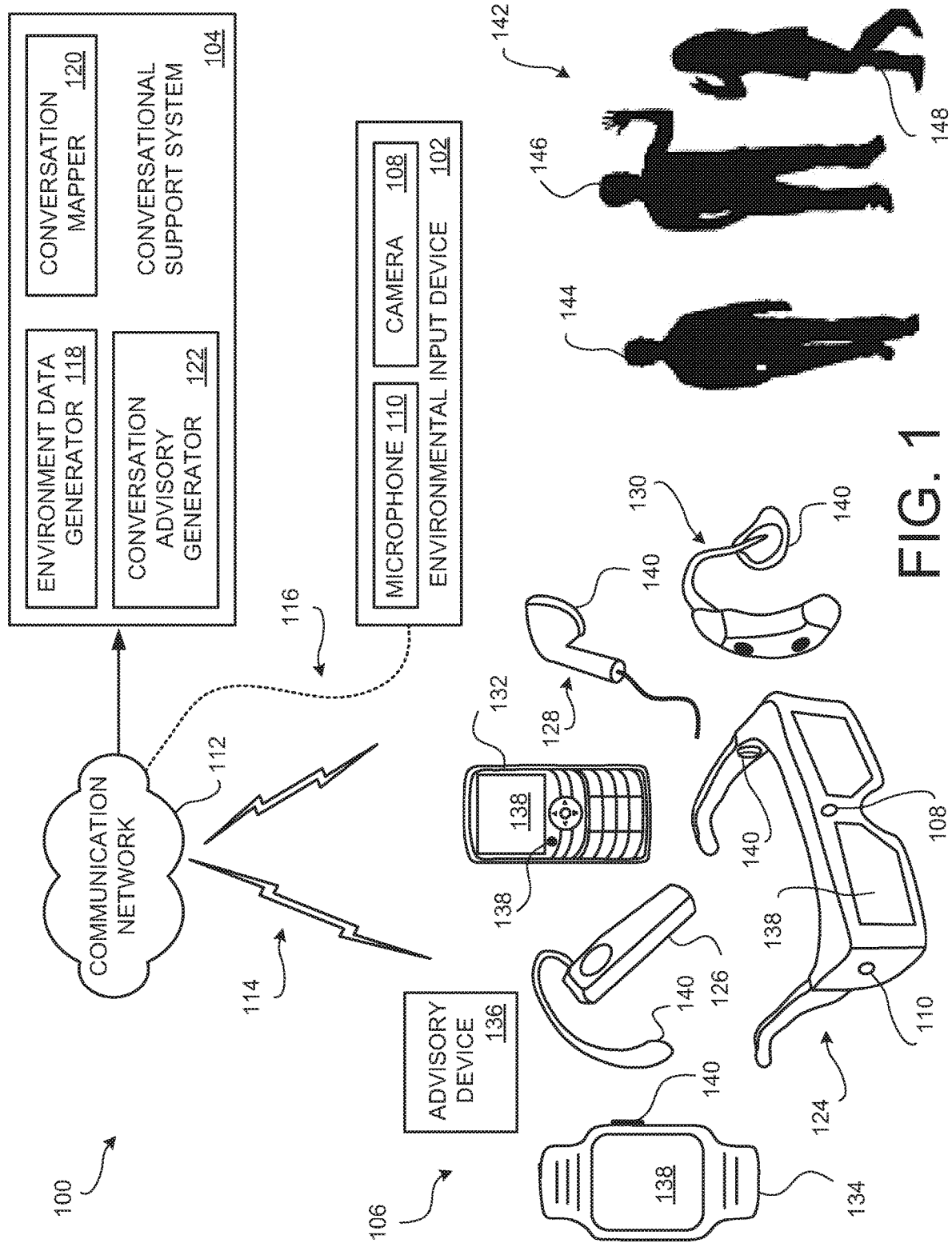
FIG. 1 is a block diagram of an embodiment of a social interaction facilitator system.

FIG. 1 is a block diagram of an embodiment of a social interaction facilitator system 100. Embodiments of the social interaction facilitator system 100 may identify an individual who is a "wallflower" during a social event, monitor the ongoing progress of a conversation that is occurring during the social event, and then provide conversation queues to the wallflower. Embodiments of the social interaction facilitator system 100 include at least one environment input device 102, a conversational support system 104, and at least one conversation queue output device 106.

Embodiments of the social interaction facilitator system 100 discretely provide a stream of video and/or audio conversation queues from the conversation queue output device 106 that can be seen and/or heard by only the wallflower. Here, discretely providing a conversation queue means that the recipient of the presented conversation queue receives the conversation queue while other participants in the social interaction event do not receive the conversation queue, and are preferably not even aware that the wallflower has received a conversation queue.

A conversation queue is video and/or audio information that pertains to the subject matter of the ongoing conversation and/or that pertains to one or more of the other participants at the social event. Based on the information provided in the conversation queues, the wallflower may then use the information in the received conversation queue to participate in the ongoing conversation in a more meaningful and active manner. Conversation queues are presented to the wallflower by presenting video and/or audio information (interchangeably referred to herein as conversation support information) using one or more conversation queue output devices 106.

However, to create meaningful and useful conversation queues, an understanding of the subject matter of an ongoing conversation, and/or an understanding of who the other participants are and what their interest might be, is required. Accordingly, the conversation environment in which a social interaction event is occurring must be monitored by embodiments of the social interaction facilitator system 100. One or more environment input devices 102 are used by the various embodiments to acquire environmental information in the vicinity of the ongoing social interaction event.

The environment input device 102 includes at least one camera 108 and/or at least one microphone 110. The camera 108 is operable to capture (acquire) a stream of image information, such as a stream of still or video images, of an ongoing conversation (which is a non-limiting example of a social interaction event) and/or images in the vicinity of the ongoing conversation. Preferably, the image information includes images of the conversation participants and other objects that are in the vicinity of the place where the conversation is occurring. The microphone 110 is operable to acquire a stream of audio (sound) information that is detectable in the proximity of the ongoing social event. The audio information includes the dialogue of the ongoing conversation that is being spoken by the conversation participants.

Further, to create meaningful and useful conversation queues, the acquired video and/or audio information must be analyzed by embodiments of the social interaction facilitator system 100 to determine an understanding of the subject matter of an ongoing conversation, and/or an understanding of who the other participants are and what their interest might be. Embodiments of the conversational support system 104 perform this analysis of an ongoing conversation and the conversation participants in real time, or at least near real time. Then, the conversational support system 104 may generate conversation queues that are communicated to one or more conversation queue output devices 106.

In the various embodiments, image information and audio information acquired by the environment input device 102 is communicated to the conversational support system 104 via a communication network 112 using a suitable wireless communication signal 114 or a suitable wire based connector 116, that communicatively couples the environment input device 102 to the communication network 112. The environment input device 102 may be communicatively coupled to the conversational support system 104 using any suitable communication network 112. The conversation queues generated by the conversational support system 104 are also communicated to the one or more at least one conversation queue output devices 106 via the communication network 112.

In one embodiment, the communication network 112 comprises a cellular telephone system, such as a radio frequency (RF) wireless system. Accordingly, the environment input device 102 includes a suitable transceiver. Alternatively, the communication network 112 may be a telephony system, the Internet, a Wi-fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the media device 102 may be implemented to communicate using other types of communication technologies, such as but not limited to, digital subscriber loop (DSL), X.25, Internet Protocol (IP), Ethernet, Integrated Services Digital Network (ISDN) and asynchronous transfer mode (ATM). Also, embodiments of the social interaction facilitator system 100 may be configured to communicate over combination systems having a plurality of segments which employ different formats for each segment that employ different technologies on each segment. In an alternative embodiment, the environment input device 102 and the conversational support system 104 may be integrated together into a single device.

The conversational support system 104 comprises an environmental data generator 118, a conversation mapper 120, and a conversation advisory generator 122. Other conversational support system 104 embodiments may include some, or may omit some, of the above-described components. Further, additional components not described herein may be included in alternative embodiments and/or may be integrated with other systems and/or devices.

One or more conversation queue output devices 106 are used to output (present) a conversation queue to the user, interchangeably referred to herein as a "wallflower" in the disclosure. A conversation queue output device 106 way be any suitable user output device that is operable to output a visual queue, an audio queue, and/or a tactile queue which facilitates participation by the wallflower in an ongoing conversation. Non-limiting examples of conversation queue output devices 106 include a headpiece 124 resembling eyeglasses that are worn by the user, an ear phone 126 that is worn on the ear of the user, an ear bud 128 that is located in the ear of the user, a hearing aid 130 that is worn in the ear of the user, a smart phone 132 or the like that is held by the user, a smart watch 134, or any other suitable advisory device 136 now known or later developed that is operable to output a visual queue, an audio queue and/or a tactile queue that is perceivable by the user.

A visual queue is presented on a display 138 of the conversation queue output device 106. Any suitable display may be used by the various embodiment to present a visual queue. The visual queue may be presented as text that is readable by the user. That is, the wallflower may read the conversation support information that is in a currently received conversation queue. Alternatively, or additionally, the visual queue may be presented as a still image, a plurality of still images, a video image, and/or a plurality of video images. Here, the wallflower see the conversation support information as an image or video clip. Any suitable visual queue may be presented to the wallflower be the various embodiments.

Some of the conversation queue output devices 106 may include one or more speakers 140. An audio queue is presented as sound that is output from at least one speaker 140 of the conversation queue output device 106. Here, the wallflower hears the conversation support information that is presented as audible speech that is heard by the wallflower. Alternatively, the speaker 140 may be a standalone electronic device that is communicatively coupled to the conversation queue output device 106 (such as headphones, ear buds, or the like). Alternatively, or additionally, the audio queue may be music, sounds made by objects (animate objects such as animals or inanimate objects such as vehicles, horns, or the like). Any suitable audio queue may be presented to the wallflower by the various embodiments.

In some instances, the headpiece 124 may be an augmented reality display device and/or a virtual reality display device that is worn by the wallflower. In situations where the wallflower is engaged in an ongoing conversation with other remote conversation participants, and where the conversation is being conducted using a augmented reality system or virtual reality system, the conversation queues can be presented to the wallflower concurrently with presentation of the augmented realty or virtual reality worlds. Visible conversation queues may be displayed on the display of the augmented reality display device and/or a virtual reality display device. Alternatively, or additionally, the visual conversation queues may be presented on another conversation queue output device 106 being used by the wallflower. Similarly, an audible conversation queue may be presented as sounds using one or more speakers of the augmented reality display device and/or a virtual reality display device. Alternatively, or additionally, the audible conversation queues may be presented using another conversation queue output device 106 that has a speaker that is being used by the wallflower. Here, the wallflower will hear and see the remote conversation participants, and will also be able to see and/or hear conversation queues.

Additionally, optional notification queues may be presented to the wallflower using the capabilities of the augmented realty or virtual reality systems. For example, an animated avatar may be presented that appears to the wallflower as another person who is participating in the conversation. The wallflower may then use this information imparted by the animated conversational queue avatar to interject comments based on the avatar's input into the ongoing conversation. Optionally, the wallflower may be the only conversation participant to see or perceive this animated conversational queue avatar (listen to their commentary and/or view their gestures). Alternatively, or additionally, an avatar may be presented as a personal advisor or the like who is discretely giving advice and information to the wallflower. Here, the remote conversation participants would also not be seeing the animated conversational queue avatar that the wallflower is seeing.

A tactile queue is physically sensed by the wallflower. Non-limiting examples of a tactile queue is a vibration that is perceptible to the user. In an example embodiment, all of or a part of the conversation queue output device 106 may be operable to vibrate. Alternatively, or additionally, the conversation queue output device 106 may be communicatively coupled to a vibration device that vibrates in response to receiving a signal from the conversation queue output device 106.

A tactile queue is particularly desirable when used in conjunction with presentation of a visual queue and/or an audio queue. A tactile queue may be generated at any suitable time. In a non-limiting example embodiment, the tactile queue is generated just prior to presentation of a visual queue on a display 138 so that the wallflower is notified of an incoming visual queue. In response to sensing or feeling the tactile queue, the wallflower understands that they should view the display 138 of their conversation queue output device 106 so that they can then view the presented visual queue. Embodiments that are configured to generate a tactile queue may be effective in assisting physically impaired users, such as a hearing impaired user, or users who are in a particularly loud conversation environment where they might otherwise miss hearing or seeing presented conversation queues.

Additionally, or alternatively, the tactile queues may be visual and/or audible in nature. For example, a flashing light and/or a fixed light of any suitable size, intensity, and/or color may be shown on a portion of the display 138 to notify the wallflower of the incoming conversation queue. Additionally, or alternatively, a low volume sound, such as a beeping noise or the like, may be emitted by the speaker 140 to inform the wallflower of the incoming conversation queue.

To conceptually illustrate operation of embodiments of the social interaction facilitator system 100, FIG. 1 illustrates a conversation environment 142 with a first person 144 (interchangeably referred to herein as the wallflower 144), a second person 146 and a third person 148 conducting a conversation pertaining to some particular topic. The conversation environment 142 may be in any suitable location where the people 144, 146, 148 are gathered together to conduct a verbal conversation among themselves. Further, any number of additional people, or even just two people (where one of the persons is the wallflower using one of more of the conversation queue output devices 106 to acquire a visual queue, an audio queue and/or a tactile queue) may be conducting a conversation among themselves.

In practice, the first step in a process of providing conversation queues to the wallflower is to acquire environmental information that includes audio content that at least the ongoing conversation being conducted in the conversation environment 142 by the conversation participants. One or more environment input devices 102 residing in and/or that are in proximity to the conversation environment 142 acquires at least audio information using the microphone 110. Additionally, or alternatively, image information (still images or video images) are acquired by the camera 108. The acquired audio and/or image information is communicated from the environment input device 102 to the conversational support system 104.

In some embodiments, the environment input device 102 is integrated with one of the conversation queue output devices 106. For example, but not limited to, the example headpiece 124 resembling eyeglasses that are worn by the user may include a microphone 110 and/or a camera 108. The audio information and/or image information acquired by the headpiece 124 is communicated from the environment input device 102 to the conversational support system 104. As another non-limiting example, a microphone (not shown) in the ear phone 126, the smart phone 132, and/or smart watch 132 may acquire audio information that is communicated to the conversational support system 104.

In overview, the audio information and/or image information communicated to the conversational support system 104 is received at the environmental data generator 118. The environmental data generator 118 processes the received audio information into discrete audio tracks, wherein each audio track is being spoken by a particular person participating in the conversation. The image information is also processed by the environmental data generator 118 to identify one or more physical objects that are visible in the received image information.

Further, the image information is time-synchronized with the audio information. If the image information is a stream of video, then individual image frames or selected image frames of the video stream and/or the image stream metadata may have time stamps or other suitable time indicators.

Alternatively, or additionally, the environmental data generator 118 may add time stamps or other suitable time identifiers into the image information, image frames, metadata, etc. Similarly, If the image information area a series of still images, then the images or selected images frames may have time stamps or other suitable time indicators. Alternatively, or additionally, the environmental data generator 118 may add time stamps or other suitable time identifiers into the images. Finally, the audio information may have time stamps or other suitable time indicators. Alternatively, or additionally, the environmental data generator 118 may add time stamps or other suitable time identifiers into the audio information. As the image information and audio information is received, then the time stamps or other time indicators may be correlated with each other to achieve time synchronization. Alternatively, or additionally, the environmental data generator 118 may identify the time stamps or other suitable time indicators of the video image frames or the still images, and then as the same time stamps or other suitable time indicators into the audio stream to achieve time synchronization.

The processed audio information and/or image information is then communicated from the environmental data generator 118 to the conversation mapper 120 to create a conversation map. The conversation advisory generator 122 monitors the generated conversation map to determine various aspects of the ongoing conversation. Based on the monitoring of the ongoing conversation, which may also include monitoring of the image information, the conversation advisory generator 122 generates a conversation queue. The generated conversation queue, which includes conversation queue audio information and/or conversation queue image information, is then communicated to one or more conversation queue output devices 106 for presentation to the wallflower (user). In response to consuming (hearing the audio conversation queue and/or viewing a visual conversation queue), the wallflower obtains insightful information pertaining to the ongoing conversation. Such acquired insightful information would aid the wallflower in participating in the ongoing conversation in a more meaningful and active manner.

To conceptually illustrate the above described overview process with respect to FIG. 1, assume that the first person 144 is the "wallflower" who is using one or more of the conversation queue output devices 106 to receive conversation queues during the ongoing conversation between the people 144, 146, 148. The subject matter of the ongoing conversation may pertain to a topic that the first person 144 is unfamiliar with, and who therefore has difficulty participating in the ongoing conversation in a meaningful manner because of their unfamiliarity with the conversation subject matter. Alternatively, or additionally, the first person 144 may have some physical and/or cognitive disability that makes it difficult for them to participate in the ongoing conversation in a meaningful and active manner.

Further assume that the second person 146 is a very outgoing and verbal type of individual that is comfortable in fully participating in the ongoing conversation. Further assume that the second person 146 is so outgoing that they effectively influence, or even control, the direction of the ongoing conversation. This second person 146 may be referred to herein as an "influencer." The second person 146, interchangeably referred to herein as an influencer 146, may have even initiated the ongoing conversation by initially engaging the first person 144 and/or the third person 148.

Also, the influencer 146 is illustrated as making a hand gesture that is emphasizing points that they are making in the ongoing conversation.

Also assume that the third person 148 is actively participating in the ongoing conversation in a meaningful manner. The third person 148 is likely providing commentary into the ongoing conversation. The commentary being made by the third person 148 may be made in response to questions asked by the influencer 146, may be made in accordance with the progression of the topical subject matter of the ongoing conversation, may be questions or comments regarding related topics that are of interest to the third person 148, etc. (It is further appreciated that in some situations, the third person 148 and/or the influencer 146 may also be using one or more conversation queue output devices 106 so as to be able to receive conversation queues from embodiments of the social interaction facilitator system 100.)

To further illustrate operation of the social interaction facilitator system 100, hypothetically assume that the subject matter (the conversation topic) of the ongoing conversation pertains to a media content event, such as a movie or other viewable program, which has a famous actor portraying one of the characters in the media content event. Further assume that the first person 144 is not very familiar with the work of this famous actor, and accordingly, is finding it difficult to participate in the ongoing conversation pertaining to the famous actor in a meaningful and active manner because of their lack of knowledge about the famous actor. The environmental data generator 118 would acquire audio information (that is, acquire the conversational portion of the ongoing conversation), and communicate the audio information to the conversational support system 104. The environmental data generator 118 and the conversation mapper 120 would work in real time, or near real time, to generate a conversation map that is monitored by the conversation advisory generator 122. Here, the conversation advisory generator 122 would ascertain that the subject matter of the ongoing conversation pertains to the famous actor, pertains to a particular scene or theme of the media content event, and/or pertains to the portrayed character. The conversation advisory generator 122, in real time or near real time, would generate a visual queue, an audio queue and/or a tactile queue (all interchangeably referred to herein as a conversation queue) that is communicated to the one or more conversation queue output devices 106 being used by the first person 144. The visual queue and/or the audio queue would comprise the conversation support information about the famous actor.

For example, a visual queue in this simplified hypothetical example may be a textual description of the famous actor's bio, a listing of other media content events that the famous actor is in, or other points of interest that could be shared with the influencer 146 and the third person 148 at some future point in the ongoing conversation. Based on the received visual queue, the first person 144 may then verbally interject a comment or the like based on the received visual queue, and thereby participate in the ongoing conversation in a more meaningful and active manner.

As yet another example, because the identity of the influencer 146 and/or third person 148 is determinable, embodiments may access supplemental personal information associated with the influencer 146 and/or the third person 148. Then, a visual queue and/or an audio queue could be generated based on conversation support information that is selected from the accessed supplemental personal information. Here, the selected conversation support information is more relevant to the current conversation subject than the non-selected supplemental information.

To illustrate, assume that the spouse of the famous actor is a favorite of the third person 148, and that the spouse has made a cameo appearance in the subject media content event. The visual queue and/or audio queue could then provide this conversation support information to the first person 144. Here, the third person 148 may be very interested in hearing about the information pertaining to the spouse of the famous actor (now in possession of the first person 144 who has consumed the conversation queue). Accordingly, after being informed by the presented visual queue and/or audio queue, the first person 144 may interject this conversation support information into the ongoing conversation at some suitable point in the ongoing conversation, and therefore participate in the ongoing conversation in a more meaningful and active manner. One skilled in the art appreciates that any relevant conversation support information may be provided in a visual queue and/or audio queue that facilitates participation of a wallflower or another individual in an ongoing conversation in a meaningful and active manner, particularly in view that the visual queue and/or audio queue can be provided to the user on a real time or near real time basis.

Figure 2:
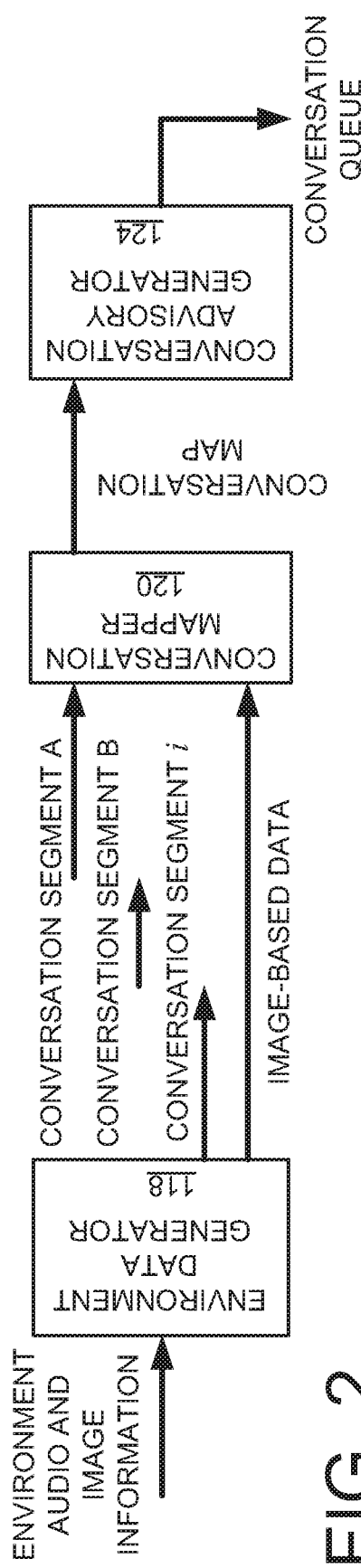
FIG. 2 is a diagram conceptually illustrating the flow of acquired audio information and image information through an example embodiment of the conversational support system.

FIG. 2 is a diagram conceptually illustrating the flow of acquired audio information and image information through an example embodiment of the conversational support system 104. In practice, the audio information and/or image information is received by the environmental data generator 118 from one or more of the environment input devices 102 that are in, or are in proximity to, the conversation environment 142. Here, the acquired audio information is a recording of the ongoing conversation itself and any background noises. The acquired image information preferably captures images of the conversation participants and images of other background objects.

One skilled in the art appreciates that as an ongoing conversation ensues, different conversation participants are speaking at different times during the ongoing conversation. The environmental data generator 118 identifies segments, or parses out segments, from the audio content stream acquired by the environment input device 102. The individual audio segments (interchangeably referred to herein as a conversation segment) are each associated with a particular individual participant in the ongoing conversation. Accordingly, one skilled in the art appreciates that a sequentially ordered series of conversation segments (wherein each conversation segment corresponds to dialogue being spoken by a particular conversation participant) can be constructed that corresponds to the dialogue of the ongoing conversation. Preferably, each conversation segment is time referenced. For example, each conversation segment may have an associated start and end time, a start time and a duration, or the like. Any suitable time reference may be used, such as a time of acquisition provided by a clock or the like residing in the acquiring environment input device 102 or a clock n the conversational support system 104.

In an example embodiment, voice and/or sound characteristics are analyzed to identify attributes of the voice of the conversation participant who is currently speaking. One skilled in the art appreciates that conversation participants are identifiable based on the sound of their vices. Each speaker's voice have particular frequency characteristics that are unique to that particular speaker. Any suitable sound attribute identification logic now known or later developed may be used by the various embodiments. The frequency of the sounds (here, vices of the conversation participants who are speaking) may be used to identify speech being spoken by a particular participant. In an example embodiments, the frequency of the current speech in the received audio stream is monitored on an ongoing basis. When the frequency of the audio sound changes, then the environmental data generator 118 determines that the current conversation participant has stopped speaking and that another person is currently speaking.

At the point in time that the audio frequency transitions, the current conversation segment ends and a new conversation segment begins. The new conversation segment can then be attributed to another one of the conversation participants. However, at this juncture, the identity of each different speaker is not known. Rather, embodiments assign a unique identifier (such as a unique number, letter or other indicator) to each different speaking participant, and the frequency characteristics are associated with that identifier. Then, when the same person is later speaking, their unique identifier can be used again to indicate that they are the particular conversation participant who is currently speaking during the ongoing conversation. The process of determining this serial sequence of conversation segments with associated unique identifiers, and providing the conversation segments to the conversation mapper 120, occurs on an ongoing basis (preferably on a real time basis, or at least a near real time basis).

Further, other background sounds may be discernible in the acquired stream of audio information are identified and parsed out as a sound segment. Such background sounds have attributes that are different from the attributes of the voices of the conversation participants. Thus, such non-voice background sounds are identifiable in the received audio information. Further, the time of each identified background sound, and optionally the duration of that background sound, are determined. Then, the video information is analyzed during that same time (or duration) to identify any potential objects that may have caused the identified background sound.

Additionally, or alternatively, the identified background sound may be compared with a database of known sounds that are attributed to particular objects. The background sound attribute may be compared the attributes associated with a plurality of objects that are known to create a particular sound. For example, a dog bark will have sound attributes that can be compared with sounds in a database. When the sound attributes of the detected barking match with or correspond to the stored attributes of barking dongs, then a determination can be made that the detected sound was that of a barking dog.

Further, if an object that has likely caused the identified sound has been identified in the image information, then a match between the determined cause of the sound with the object can be used to verify the source of the sound. Here, a time that the background sound occurred is identified. An image from the received stream of image information is selected that was acquired at the same time that the background sound occurred. Sound attributes that describe sounds known to be caused by the identified object are accessed from a memory medium. The sound attributes that describe sounds known to be caused by the identified object are then compared with the attributes of the identified background sound. The identified object is determined to have caused the background sound when the sound attributes associated with the identified object match the attributes of the identified background sound. Then, a conversation queue that describes or shows an image of the identified object that caused the background sound is generated.

For example, if an image of a dog that is barking is identified in the video information, and if the identified sound can be attributed to a barking dog, then a determination can be made that the sound was caused by a barking dog. Any suitable sound attribute identification and comparison logic now known or later developed may be used by the various embodiments.

In response to identifying an image of an object that has caused the background sound, an optional visual queue and/or audio queue describing the background sound in the identified sound segment (which is also a type of conversation segment) may be provided to the wallflower. For example, a loud and abrupt background sound may briefly disrupt the ongoing conversation. The cause of the background sound may then be determined based on an analysis of the identified sound segment. The cause of the background sound (the pertinent conversation support information that identifies the loud background noise) may then be indicated to the wall flower in a generated conversation queue. Then, the wallflower may share this information with the other conversation participants. Presumably, the conversation then continues on about the subject topic. Here, the wallflower has participated in the ongoing conversation in a more meaningful and active manner by explaining the cause of the disrupting background noise to the other conversation participants.

The conversation segments and the image-based data that have been determined by the environmental data generator 118 are communicated to the conversation mapper 120. Each of the conversation segments and the image-based data are time sequenced with each other. For example, each conversation segment has an associated start time and end time (or a start time and a duration) that corresponds to the time that the particular conversation segment was being spoken by a particular conversation participant. Time information associated with each identified object and/or the identified object attributes is associated with the communicated image-based data.

In the various embodiments, the conversation participants are optionally identified by the conversation mapper 120 based on the acquired image information. In some embodiments, the known frequency attributes of the voice of a particular conversant participant are already known and have been stored in a suitable voice attributes database. For example, the frequency attributes of the voice of the wallflower 144 are already known, and the identity of the wallflower 144 is also known (since they are the person who is using the social interaction facilitator system 100). If the wallflower 144 has already had conversations with one or more of the current conversation participants, the frequency attributes of the voice of these other individuals may have been previously determined as saved into the voice attributes database.

In some embodiments, an person and/or object identification algorithm analyzes the received image information acquired by the camera 108 (FIG. 1) to identify the conversation participants and other objects that are discernible in the acquired image information. Then, attributes about each identified person and/or object are determined.

For example, if an identified object is a person, then facial attributes of the person are identified. Then, the identity of the currently speaking person can be determined. An example embodiment employs a facial recognition algorithm to identify participants in the conversation. If the identified object is an inanimate physical object, the attributes of that inanimate object are used to identify the object. Any suitable object recognition and objet/person identification system or algorithm now known or later developed may be used by embodiments of the social interaction facilitator system 100.

Further, embodiments may access personal information associated with the known wallflower and/or other known conversation participants to identify a conversation participant. If images of "friends" of the wallflower and/or other known conversation participants are available in the personal data that is accessed, such images can be compared with images of the unknown conversation participant to verify their identity. Here, the accessed image is compared with an image of the unknown conversation participant acquired by the camera 108 during the ongoing conversation. Any suitable facial recognition and comparison algorithm now known or later developed may be used to compare the image information and confirm identity of the unknown conversation participant.

Alternatively, or additionally, the dialogue of the conversation (the spoken words) may be analyzed to identify a conversation participant. If the name of a conversation participant is spoken, such as during an introduction, then the identity of the conversation participant is identifiable based on the spoken name. If only part of a speaker's name is spoken, such as a first name and/or a nickname, embodiments may access personal information associated with the known wallflower and/or other known conversation participants to identify a conversation participant. Here, accessed personal information may include a list of known "friends" of the wallflower and/or other known conversation participants. The listed identify of such friends (by name and/or nickname) may be compared with the determined name of a conversation participant. Then, the identity of the unknown conversation participant may be determined based on a spoken first name and/or nickname.

The image-based data associated with a particular identified participant may be useful in various ways. First, each of the identified conversation segments can be associated with an identified conversation participant who is currently speaking during the conversation. That is, dialogue being spoken by different conversation participants can be attributed to a particular identified person. One skilled in the art appreciates that as a conversation progresses among a plurality of conversation participants, different participants are speaking at different times during the ongoing conversation. The participant identity information is associated with each conversation segment so that the particular identified participant that is speaking at any time during the ongoing conversation is identified and is then associated with the conversation segment.

Further, the image-based data may optionally include informational queues pertaining to a currently speaking conversation participant and/or to a listening conversation participant. For example, but not limited to, image analysis may be used to identify facial characteristics and/or bodily gestures being made by the identified conversation participant during the ongoing conversation. Here, identified facial characteristics and/or body gestures may be used to determine a sincerity level and/or an emotional state being experienced by the associated conversation participant. Any suitable facial characteristic and/or bodily gesture identification system or algorithm now known or later developed may be used by the various embodiments.

As another example, even though a conversation participant is not currently speaking, facial expressions and/or body gestures may be used to determine that the participant is either disagreeing with or is agreeing with the commentary currently being spoken by another one of the conversation participants. To illustrate, a smile, a nodding of their head, open arms, or the like, may indicate that the conversation participant agrees with the statement being made by the speaking conversation participant. Conversely, a frown, a shaking of their head, crossed arms, or the like, may indicate that the conversation participant disagrees with the statement being made by the speaking conversation participant. This gesture-based and/or facial expression-based information, and their determined implications, may be included in the conversation map. Since the time of image acquisition is known, the occurrence time of the identified facial characteristics and/or bodily gestures may be synchronized time-wise with the concurrently occurring conversations segment. For example, if the image-based data corresponds to a facial expression and/or body gesture of a particular conversation participant, the associated time indicates when the conversation participant made that particular facial expression and/or body gesture during the ongoing conversation.

The image-based data also includes information identifying other physical inanimate objects that are discernible in the image information acquired by the environment input device(s) 102. Such identified physical objects may become relevant to the ongoing conversation at some point in time. Accordingly, the visual queues and/or audio queues generated by the conversation advisory generator 122 may include information about any identified inanimate physical objects that the wallflower may share with the other conversation participants at some suitable point in the ongoing conversation. This information may assist the wallflower who has received the visual queue and/or audio queue to participate in the ongoing conversation in a more meaningful and active manner.

Figure 3:
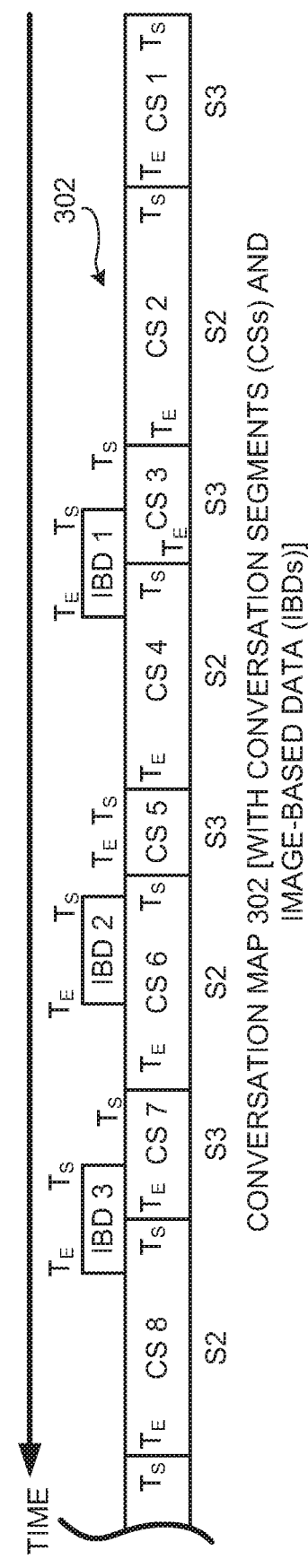
FIG. 3 is a conceptual graphical representation of a hypothetical generated conversation map.

FIG. 3 is a conceptual graphical representation of a hypothetical generated conversation map 302. The conversation map 302 is generated by the conversation mapper 120 based on the received conversation segments and the image-based data acquired by the environmental data generator 118 that has been received from the environment input device 102.

Each conversation segment (conceptually illustrated as conversation segments CS 1-CS 8 in this simplified hypothetical example) is associated with a start time (Ts) and an end time (Te) and/or a duration. Further, each conversation segment is associated with a particular conversation participant, or speaker. In this simplified example, the first speaker (S1) is associated with the identity of the first person 144 (FIG. 1). This first speaker is the wallflower in this simplified example. The second speaker (S2) is associated with the identity of the second person 146 (FIG. 1). The third speaker (S3) is associated with the identity of the third person 148 (FIG. 1).

As can be observed in FIG. 3, the ongoing conversation is an exchange of dialogue between the second person 146 (S2) and a third person 148 (S3). The wallflower (the first person 144, S1) is not participating in this particular portion (CS 1-CS 8) of the ongoing conversation.

In the various embodiment, the conversation map 302 includes image based data (IBD). The conversation mapper 120 analyzes the received image information to identify objects. When an object is identified, then an image, selected video image frames, or a video clip of the identified object is generated and is added into the conversation map 302. In some embodiments, the image based data is a segmented portion of the received video information acquired by the camera(s) 108. Alternatively, or additionally, the image based data may be a selected portion of the received video information, such as a cropped out portion of the image data that is limited to, or is substantially limited to, an image of the identified object.

For example, but not limited to, the identified object may be the second person 146. The image information may include facial characteristics of the second person 146 as they are speaking during the ongoing conversation. These facial expressions may be later analyzed to determine some characteristic of the second person 146 as they are speaking, such as an emotion and/or a sincerity level that is then associated with the subject matter of the corresponding conversation segment. Alternatively, or additionally, a gesture being made by the second person 146 may be included in the image based data. The gesture may be later analyzed to determine some characteristic of the second person 146 as they are speaking, such as an emotion and/or a sincerity level that is then associated with the subject matter of the corresponding conversation segment.

If a non-person object is identified, then image information for that identified object may be used to generate the image based data that is output by the conversation mapper 120. For example, if the image data includes a dog (that is barking and that is potentially interrupting the conversation), then the image of the barking dog is output by the conversation mapper 120. (Then, the conversation advisory generator 122 may include an image of the barking dog and/or textual description of the barking dog in a visual queue, and/or may include an audible description of the barking don in an audible queue.)

Each segment of the image based data (IBD) is associated with a start time (Ts) and an end time (Te) and/or a duration. Optionally, each image based data segment may be associated with a particular conversation participant, or speaker, if the identity of that object (here, a person) can be determined.

Summarizing, the conversation stream 302 output from the conversation mapper 120 is a time-sequenced stream of conversation segments (corresponding to the dialogue of the ongoing conversation) and image based data segments. The conversation map 302 is preferably generated in real time, or near-real time. The generated conversation map 302 is then communicated to the conversation advisory generator 122 (FIGS. 1-2) for analysis. Based on the analyzed conversation map 302, conversation queues may be generated and then communicated to one or more of the conversation queue output devices 106 being used by the wallflower 144.

Figure 4:
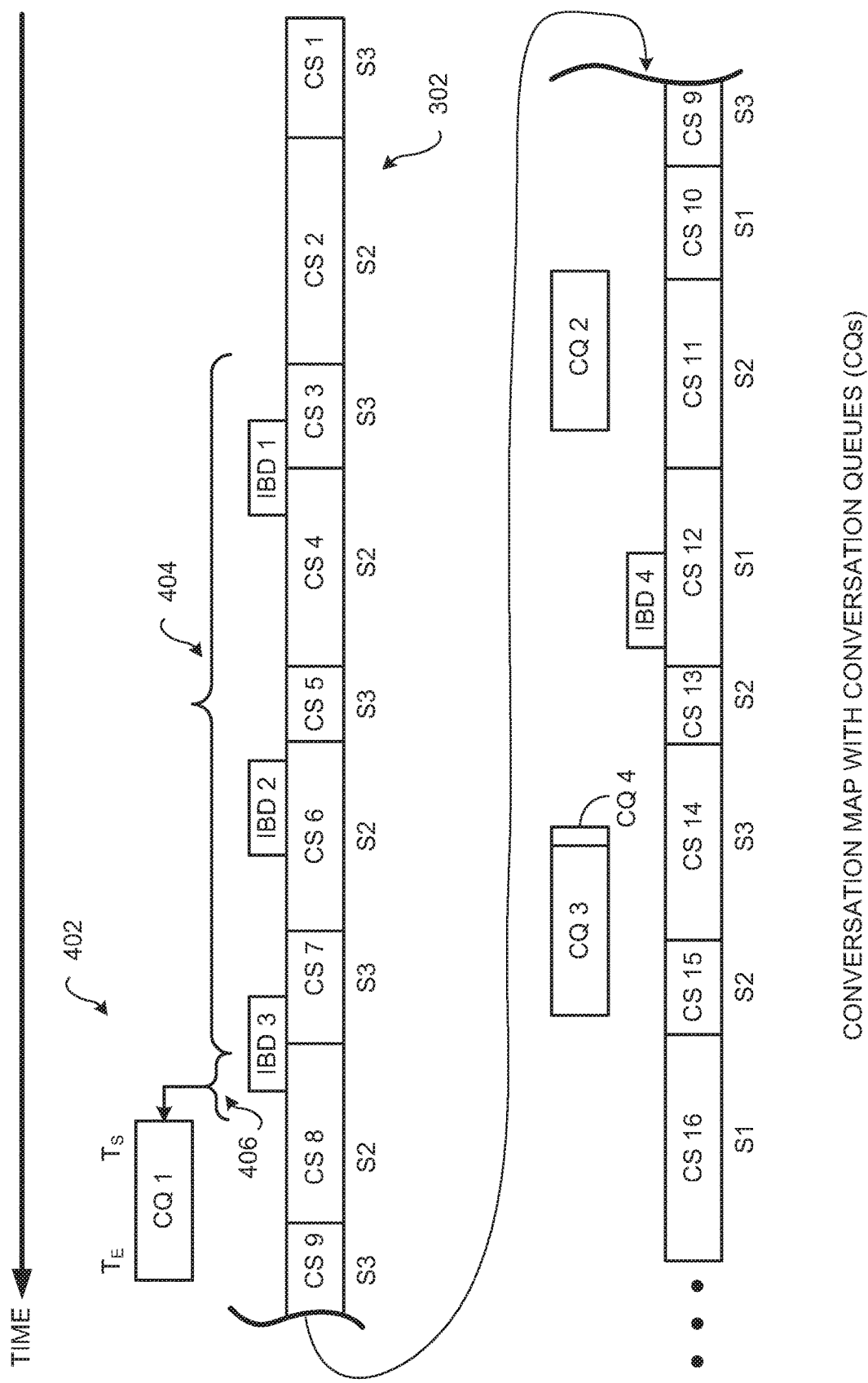
FIG. 4 is a conceptual graphical representation of a hypothetical generated plurality of conversation queues that illustrate the resultant increase in conversational activity of the wallflower.

FIG. 4 is a conceptual graphical representation of a hypothetical generated plurality of conversation queues 402 that illustrate the resultant increase in conversational activity of the wallflower 144. Here, in response to consuming the generated conversation queues that are communicated to and that are presented by the conversation queue output devices 106, the wallflower 144 will acquire conversation support information that is pertinent to the ongoing conversation and/or that is pertinent to one or more of the other participants in the ongoing conversation. This acquired conversation support information may be used by the wallflower to participate in the ongoing conversation in a more meaningful and active manner.

In the simplified hypothetical example of FIG. 4, the conversation advisory generator 122 analyses the received conversation map 302 on a real time basis, or near real time basis. The dialogue of each conversation segment has been converted by the conversation mapper 120, in an example embodiment, into words, text, phrases, sentences, or the like.

Then, a natural language processing algorithm of the conversation advisory generator 122 is used to determine the subject matter of the dialogue being spoken by each conversation participant.

Further, since the identity of each conversation participant is known, the flow of the conversation between speakers can be analyzed to determine the extent of participation of each conversation participant in the ongoing conversation. In this simplified example, it is apparent that the wall flower 144 (S1) is not actively participating in the ongoing conversation since the conversation segments CS1-CS8 correspond to dialogue being spoken by the second person 146 (S2) and a third person 148 (S3). That is, the wallflower 144 is not participating in the ongoing conversation and has been silent during this portion of the conversation.

The conversation advisory generator 122, in this simplified example, is determining the subject matter of an immediately preceding portion 404 of the conversation, conceptually illustrated to encompass the conversation segments CS3-CS7 in this simplified hypothetical example. In practice, any suitable preceding duration of the ongoing conversation may be analyzed to determine the current subject or topic of the ongoing conversation. Further, the duration of the immediately preceding portion 404 of the conversation may be dynamically adjusted based on the content and/or subject matter of the ongoing conversation. For example, if the conversation subject and/or topic changes, then the duration of the immediately preceding portion 404 of the conversation may be decreased so as to encompass the discussion pertaining to the new conversation subject and/or topic. As the conversation about the new conversation subject and/or topic ensues, the duration of the immediately preceding portion 404 of the conversation may then be dynamically increased so as to encompass the relevant discussion about the new conversation subject and/or topic. Once a conversation queue has been generated (which pertains to the new conversation subject and/or topic), the duration of the next analyzed immediately preceding portion 404 of the conversation might be reduced so that new and more currently relevant conversation support information is determined.

Once the conversation subject and/or topic of the immediately preceding portion 404 of the conversation has been determined, the conversation queue output devices 106 may access a suitable source of supplemental information to identify supplemental information that is likely to be pertinent to the ongoing conversation. In practice, at least one keyword that characterizes the determined subject matter of the current portion of the conversation is determined. The determined at least one keyword is compared with keywords of a plurality of supplemental information that is stored in a memory medium. The selected plurality of supplemental information is then selected from the stored plurality of supplemental information when the keyword of one of the stored plurality of supplemental information matches the at least one keyword that characterizes the determined subject matter of the current portion of the conversation.

The accessed stored supplemental information may be stored locally or remotely in a suitable memory medium. For example, if conversation topics often involve media content events, and if a plurality of stored supplemental information associated with media content events are often used as conversation support information, then embodiment may pre-acquire supplemental information and store such supplemental information locally. An advantage provided by such pre-acquisition and local storage of some supplemental information is that the locally stored supplemental information may be more quickly accessed for analysis.

If the supplemental information is stored on a remote server, the conversation advisory generator 122 can establish a connection to the remote server via the communication network to access the supplemental information. For example when the subject and/or topic of the conversation pertains to a media content event, the conversation advisory generator 122 may communicate a request (with at least one keyword that characterizes the determined subject matter of the current portion of the conversation) to the remote server identifying the subject media content event. The supplemental information pertaining to the identified media content event may then be selected by the remote server (when the keywords of the stored supplemental information matches the at least one keyword that characterizes the determined subject matter of the current portion of the conversation). The selected supplemental information may then be communicated from the remote site to the conversation advisory generator 122.

Preferably, a plurality of remote sources of supplemental information have been predefined (pre-identified) such that the supplemental information can be more quickly accessed. Further, supplemental information categories that describe attributes, subject matter, or other characteristics of the supplemental information may be predefined and then associated with the supplemental information. Additionally, or alternatively, keywords or other indicators may be associated with the supplemental information. For example, the ongoing conversation may pertain to a particular media content event, such as movie, program or other viewable event, that has been recently consumed (viewed) by the conversation participants. Based on the title of the media content event (a keyword), the conversation advisory generator 122 may access supplemental information pertaining to the that particular media content event (which have keywords associated with the title).

Alternatively, or additionally, an Internet browser or other suitable topical search algorithm may be used to locate and then access relevant supplemental information that pertains to the ongoing conversation topic. The conversation advisory generator 122 may browse the available supplemental information residing at a plurality of remote servers, and pick and select the most relevant supplemental information of interest. Here, the selected conversation support information is more relevant to the current conversation subject than the non-selected supplemental information. For example, once the subject matter of the immediately preceding portion 404 of the conversation has been determined, a plurality of keywords descriptive of the conversation topic may be selected and then used to construct a search phrase that is used by the browser algorithm to locate and select the supplemental information. Any suitable information browser algorithm now known or later developed may be used by the various embodiments.

In some instances, the subject matter of the immediately preceding portion 404 of the conversation may relate to a particular event, a particular theme, a particular character, etc., of the media content event. For example, the topic of the current portion of the ongoing conversation may pertain to a particular actor. Using the name of the actor, the browser algorithm may search a plurality of different remote information sources to locate and acquire supplemental information about the actor (using the actor's name, for example, which is itself a type of keyword).

Other sources of supplemental information may be alternatively, or additionally, accessed by the conversation advisory generator 122. For example, the subject matter of the immediately preceding portion 404 of the conversation may relate to a particular actor. Or, the conversation may relate to a portion of the media content event wherein the actor is appearing in. Here, the conversation advisory generator 122 may access supplemental information regarding the particular actor, such as personal information or trivia about the actor that may be available on a social network or the like. Additionally, or alternatively, the supplemental information may pertain to their appearances in other media content events, their relationships to other actors and/or other people, and/or even performance reviews about the actor made by third parties. Any suitable supplemental information of interest that pertains to the immediately preceding portion 404 of the conversation may be identified.

In some instances, the conversation map 302 for the immediately preceding portion 404 of the conversation that is being analyzed may include image based data. The image based data is analyzed to further refine the conversation subject and/or topic of the immediately preceding portion 404 of the conversation. For example, the image based data may include images of a barking dog that is interrupting the conversation. (Here, the conversation advisory generator 122 determines that an interruption in the conversation has occurred, which is also considered a conversation subject and/or topic.) Thus, the wallflower 144 may be provided a conversation queue about the barking dog.

As noted herein, the image based data may include facial expressions and/or gestures of a particular participant. This information may be used to further identify relevant supplemental information. For example, a facial expression may indicate that a participant disagrees with what has been said in the immediately preceding portion 404 of the conversation. The conversation advisory generator 122 may then acquire supplemental information that supports, or is contrary to, the viewpoint of the disagree participant. To illustrate, the participant may disagree with an alleged fact made during the conversation. However, if the participant's disagreement in factually incorrect, the correct factual information and/or other supporting information (here, conversation support information that is selected from the accessed supplemental information), may be acquired by the conversation advisory generator 122. The correct factual information may then be used to generate a conversation queue that is provided to the wallflower 144. In response to consuming the conversation queue, the wallflower 144 would then have the correct facts to interject into the ongoing conversation.

The conversation advisory generator 122 then identifies, using the accessed supplemental information, pertinent conversation support information that is highly relevant to the immediately preceding portion 404 of the conversation. Here, once a variety of supplemental information has been acquired, embodiments select from the acquired supplemental information the conversation support information that is to be incorporated into a conversation queue. The conversation support information may be some interesting fact or other piece of information that is acquired from the supplemental information about the current conversation subject and/or topic, such as the subject media content event.

One skilled in the art appreciates that for any particular conversation topic that pertains to the immediately preceding portion 404 of the conversation, that a relatively large amount of supplemental information may be identified and then acquired. To present all of the acquired supplemental information to the wallflower 144 in ne or more conversation queues is undesirable in that the wallflower 144 may be overwhelmed by the breadth of and/or the amount of presented information. Further, the supplemental information may relate to a plurality of different possible conversation subjects and/or topics. For example, a particular piece of supplemental information may pertain to a particular media content event, a particular actor, and a particular theme of the media content event. Another particular piece of supplemental information may pertain to the same particular media content event, but pertain to a different actor, and/or may pertain to a different theme of the media content event. To concurrently select both pieces of supplemental information as the conversation support information of a generated conversation queue may simply confuse the wallflower 144 as to "what" they should say next as they enter into the ongoing conversation with their commentary that is based on the presented conversation support information.

To solve this problem of potentially overburdening the wallflower 144 with large amounts of conversation support information, and/or conversation support information that pertains to different potential conversation topics, embodiments are configured to analyze the identified and accessed supplemental information, and then based on that analysis, select a limited amount of conversation support information that is highly likely to be pertinent to the particular topic of the immediately preceding portion 404 of the conversation.

In some instances, embodiments select the conversation support information based on a consideration of whether the selected conversation support information is likely to be known by all or most of the conversation participants, or whether the selected conversation support information is more likely to not be known by all or most of the conversation participants. Here, the plurality of supplemental information is categorized as being of they type of information that is generally known or the type of information that is not generally known. To provide the wallflower 144 with conversation support information that is likely to be of interest, one or more instances of the supplemental information that is not generally known may be selected to be the conversation support information. Thus, the wallflower 144, upon consuming the conversation support information provided in a conversation queue, is now in possession of information not generally known to the conversation participants.

However, is some situations, the wallflower 144 may not be informed, or may only be partially informed, about the topic of the immediately preceding portion 404 of the conversation. Here, it is difficult for the wallflower 144 to participate in the ongoing conversation since they simply do not understand what is being discussed. Accordingly, one or more instances of the supplemental information that is generally known may be selected to be the conversation support information. Thus, the wallflower 144, upon consuming the conversation support information provided in a conversation queue, is now more informed about the topic of the ongoing conversation. Such information may be stored is a suitable personal information database associated with the wallflower 144.

To illustrate, the conversation may generally pertain to episodes of an ongoing television program series. The wallflower 144 may have missed watching the particular episode that is currently being discussed, which is determinable from the personal information associated with the wallflower 144. Here, the selected conversation support information may be a general synopsis of the missed episode (which is information that is generally known by all of or most of the conversation participants). Accordingly, the wallflower 144 can better appreciate that the conversation that is currently discussing the missed episode. Therefore, the wallflower 144 may be more able to participate in the ongoing conversation after they understand what happened in the missed episode.

In the various embodiments, selection of the conversation support information begins with an assessment of the characteristics of the wallflower 144 that have been stored into the personal information database. The personal information may be stored locally or remotely. Here, various personal information about the wallflower 144 is accessed by the conversation advisory generator 122.

One skilled in the art appreciates that such information about the wallflower 144 has been previously acquired using any suitable source of personal information acquisition. For example, user profiles of community members participating in a internet-based community may be accessed. The user information may have been provided by the user, and/or may have been acquired based on prior activities of that user while interacting within the community. A variety of different information sources may be used to acquire personal information about the wallflower 144.

As another example, the personal information about the wallflower 144 may indicate particular media content events that have been consumed by the wallflower 144. Alternatively, or additionally, the viewing habits and/or preferences of the wallflower 144 may be known and saved into the personal information database. This information may be used to determine the conversation support information. For example, if it is known that the wallflower 144 has not viewed the subject media content event that is currently being discussed, then the conversation support information may be selected from the more generally known supplemental information. Conversely, if it is known that the wallflower 144 has viewed the subject media content event that is currently being discussed, then the conversation support information may be selected from the less generally known supplemental information. Further, one skilled in the art appreciates that as conversation subjects and/or topics change during an ongoing conversation, the nature of the supplemental information may be modified based on the analysis of the immediately preceding portion 404 of the conversation. For example, if a series of related media content events are being discussed, then the conversation support information may be general information if the wallflower 144 has not viewed a particular episode, and then may change to less generally known information when the current series being discussed has been viewed by the wallflower 144. This knowledge of what particular media content events that the wallflower 144 has previously viewed may be obtained from viewer history records provided by various content providers or social media platforms (and then optionally stored into the personal information database).

Alternatively, or additionally, the user preferences and likes may be used to identify topics that the wallflower 144 is likely to be familiar with. For example, the wallflower 144 may like science fiction related media content events. If the ongoing conversation pertains to science fiction media content events, then the selected conversation support information may be less generally known supplemental information since there may be a presumption that the wallflower 144 has an appreciation of the topics of the ongoing conversation. In contrast, if the topics pertain to romantic media content events, and the wallflower 144 dislikes such romantic media content events and/or has viewed very few romantic media content events, then the supplemental information that is selected for the conversation support information may be generally known information pertaining to romantic media content events.

Alternatively, or additionally, characteristics about previously provided conversation queues that have been previously provided to the wallflower 144 in previous conversations and/or in conversations with different participants may be used to identify the type of conversation support information that may be most useful to the wallflower 144. Here, previously generated conversation queues and/or the conversation support information is stored for the ongoing conversation, or even from previous conversations, into a conversation queue history database.

For example, in previous conversations in which the wallflower 144 was a participant, the type of conversation support information may be of the type of information that is generally not known. That is, in such previous conversations, the wallflower 144 was generally well informed about the current topics of conversation. For example, when the previous conversation pertained to science fiction media content events is which the wallflower 144 was well versed in, the previously provided conversation support information may have been of the type of information that is not generally known. In contrast, in previous conversations pertaining to romantic media content events, the previously provided conversation support information may have been of the type of information that is generally known. In such embodiments, characteristics of previously provided conversation support information are determined and are stored for later reference. Then, characteristics of the currently discussed topic of the ongoing conversation are compared with the characteristics of the previously provided conversation support information. Then, individual supplemental information that have the same characteristics as the previously provided conversation support information may be selected as the conversation support information that is to be provided in a generated conversation queue.

As yet another example of a personal characteristic of the wallflower 144 that may be used in the selection of conversation support information, a physical attribute of the wallflower 144 may be relevant. The physical attribute information may be stored in the personal information database. For example, the wallflower 144 may be physically handicapped so as to be unable to participate in sporting events. In situations where the conversation topic pertains to a particular sporting event, or type of sporting event, that the wallflower 144 is likely to be unfamiliar with, generally known information pertaining to the sporting event may be selected as the conversation support information (since a presumption that the wallflower 144 is not well versed in such topics may be reasonable). As another example, the wallflower 144 may be visually impaired. In situations where the conversation topic pertains to visual arts, such as a particular famous painting, generally known information that audibly describes the painting may be selected as the conversation support information (since a presumption that the wallflower 144 has not personally viewed the painting may be reasonable). As yet another example, the wallflower 144 may be unable to understand complex mathematical algorithms. Here, if the current topic pertains to complex mathematics (such as when lunar orbits and spacecraft are being discussed), the selected conversation support information may be a general description that the wallflower 144 is able to understand.

Alternatively, or additionally, personal information about the wallflower 144 may include their educational background and/or their work experience. For example, if the wallflower 144 studied engineering in college, and is therefore likely well informed about mathematical related topics in their field of work, then less well-known supplemental information may be selected as the conversation support information. In contrast, if the current conversation topic pertains to a field that the wallflower 144 is unfamiliar with, the supplemental information that is selected for the conversation support information may be general in nature. Here, characteristics relating to the education and/or work experience of the wallflower 144, characteristics of the current conversation subject and/or topic, and characteristics of the acquired supplemental information, are compared with each other. Supplemental information having characteristics that correspond with or match with the characteristics of the education level and/or work experience of the wallflower 144 are selected as the conversation support information.

Alternatively, or additionally, personal information about the wallflower 144 may include their cultural background. For example, the wallflower 144 may have been raised in a particular ethnic community, and is therefore likely well informed about topics of interest to that community. If the conversation subject and/or topic pertains to information that is generally appreciated by the ethnic community of the wallflower 144, then less well-known supplemental information may be selected as the conversation support information. In contrast, the conversation subject and/or topic may pertain to a culture that the wallflower 144 is uninformed about. Thus, more general supplemental information may be selected as the conversation support information. Here, characteristics relating to the cultural of the wallflower 144, characteristics of the current topic, and characteristics of the acquired supplemental information are compared with each other. The supplemental information having characteristics that correspond with or match with the characteristics of the cultural background of the wallflower 144 are then selected as the conversation support information.

Alternatively, or additionally, characteristics of the particular conversation queue output devices 106 being used by the wallflower 144 may be used to select the conversation support information. In an example embodiment, the particular conversation queue output devices 106 are stored in the personal information database. Additionally, or alternatively, the conversational support system 104 may query and/or detect the particular conversation queue output devices 106 being used by the wallflower 144. Such an embodiments is particularly beneficial if the wallflower uses different conversation queue output devices 106 at different times.

For example, embodiments may determine that the wallflower 144 is only using the type of conversation queue output devices 106 that present audio only information. Accordingly, the acquired supplemental information that provides image based information would not be selected as the conversation support information. Conversely, embodiments may determine that the wallflower 144 is only using the type of conversation queue output devices 106 that present visual only information. Accordingly, the acquired supplemental information that is more suitable for audible presentation would not be selected as the conversation support information. Here, a characteristic of the currently used conversation queue output device(s) 106 (wherein the characteristic is a visual presentation device and/or is an audio presentation device) is compared with a corresponding characteristic of instances of the supplemental information. If the characteristics match, then those instances of supplemental information that have the matching characteristic may be selected as the conversation support information.

In the event of selection of a plurality of candidate instances of different conversation support information, further refinement to arrive at a final selection of the conversation support information that is included in a conversation queue may be optionally performed by the various embodiments. Here, characteristics and/or attributes for each one of the candidate instances of different conversation support information are determined. Then, a most relevant one of the candidate instances of different conversation support information is selected as the conversation support information that is used to generate the conversation queue. A variety of factors and considerations may be used by the various embodiments to select the conversation support information from among the candidate instances of different conversation support information.

A first non-limiting example consideration is an assessment of the direction that the conversation is most likely to be headed. For example, conversation about a particular conversation subject and/or topic may be nearing exhaustion. That is, the conversation participants may have been discussing this particular conversation subject and/or topic for a relative long duration such that is it likely that the conversation subject and/or topic will be changing in the near future. In such situations, the direction of the conversation may be determined. Once the likely new direction of the conversation has been determined, then the different candidate instances of conversation support information which most closely pertain to the anticipated direction of conversation change may be selected as the conversation support information.

In contrast, a relatively short duration of the ongoing conversation subject and/or topic may have occurred. Here, it is reasonable to anticipate that the conversation will remain directed towards the current topic for at least some future duration. Accordingly, the different candidate instances of conversation support information which most closely pertain to the current conversation topic may be selected as the conversation support information. Accordingly, an attribute or characteristic of each one of the candidate instances of conversation support information are compared with the corresponding characteristics of the conversation subject and/or topic. The candidate instance of conversation support information which most closely pertains to the anticipated direction of conversation change may then be selected as the conversation support information. That is, the candidate instance of conversation support information having its attribute or characteristic which most closely matches or corresponds to the attribute or characteristic of the anticipated conversation topic is selected as the conversation support information.

Alternatively, or additionally, preferences of the wallflower 144 may be used to select from among the candidate instances of different conversation support information. For example, multiple anticipated conversation subjects and/or topics may be identified. That is, the conversation may be changing towards one of multiple different conversation subjects and/or topics. Here, the candidate instance of conversation support information having an attribute or characteristic which most closely matches or corresponds to an attribute or characteristic of a conversation subject and/or topic that the wallflower 144 is interested in may be selected as the conversation support information that is used to generate a conversation queue. Accordingly, the conversation queue may enable the wallflower 144 to manage the direction of future conversation.

Alternatively, or additionally, preferences of one of the other conversation participants may be used to select from among the candidate instances of different conversation support information when multiple anticipated conversation topics may be identified. Such preference information may be stored in the personal information database. In this situation, attributes or characteristics pertaining to a selected conversation participant are accessed. Then, the candidate instance of conversation support information having an attribute or characteristic which most closely matches or corresponds to the attribute or characteristic of the other conversation participant may be selected as the conversation support information that is used to generate a conversation queue. Accordingly, the conversation queue may enable the wallflower 144 to manage the direction of future conversation in a manner that is of interest to one of the other conversation participants.

Alternatively, or additionally, a degree of likely interest for each one of the candidate instances of different conversation support information may be determined. Here, a degree of interest is determined for each candidate based on a likelihood of interest to each of the conversation participants. Here, personal information for each conversation participant is accessed from the personal information database. Based on the accessed personal information, a degree of interest is determined for that particular conversation participant. For example, the determined degree may be based on a scale, such as from one to ten or the like (or high interest, little interest, no interest, etc.). Then, the degree of interest determined for each of the conversation participants for each of the candidate instances of different conversation support information is determined, such as by summing the individual degrees of interest determined for each conversation participant.

Weighting may be used to increase the determined degree of interest for some of the conversation participants. For example, the conversation participant who is identified as the "influencer" may have a more heavily weighted degree of interest. Alternatively, or additionally, a conversation participant who is a close personal friend of the wallflower 144 may have a more heavily weighted degree. Such interpersonal relationship information may be stored in the personal information database. Alternatively, or additionally, a conversation participant who is not a close personal friend of the wallflower 144, or who may even be disliked by the wallflower 144, may have a lesser weighted degree of interest. The candidate instance that has the highest determined degree of interest is selected as the conversation support information.

One skilled in the art appreciates that the process of selecting the conversation support information from among a large number of instances of the acquired supplemental information is very complex. The various embodiments employ an artificial intelligence (AI) algorithm to rapidly acquire the supplemental information, and then to select the conversation support information from the acquired supplemental information using one or more of the above-described methods. Since such AI algorithms are well known, the particular implementation of embodiments to perform the above-described processes of identifying conversation segments from the acquired audio information, identifying objects from the acquired video information, constructing the conversation may 302, acquiring supplemental information and then selecting the conversation support information, and then generating the conversation queues, are not described herein in detail. One skilled in the art posses such AI implementation knowledge to enable practice of the invention described herein.

Returning to the conceptual simplified hypothetical example of FIG. 4, the first conversation queue (CQ 1) is generated and communicated to one or more of the conversation queue output devices 106 (FIG. 1). Here, FIG. 4 conceptually illustrates that the first conversation queue (CQ 1) is presented during a portion of the conversation that corresponds to the conversation segments CS 8 (wherein the conversation dialogue is being spoken by the second person 146 (S1)) and CS 9 (being spoken by the third person 148 (S3)). Prior to the conclusion of the dialogue being made by the third person 148 (at the end of the conversation segment C9), the wallflower 144 has consumed (has listened to and/or heard the conversation support information in the first conversation queue (CQ 1). Here, the presented conversation support information has been considered by the wallflower 144 such that the wallflower 144 is able to devise dialogue that they might like to interject into the ongoing conversation.

Accordingly, FIG. 4 conceptually illustrates that the wallflower 144 (S1) is speaking during the portion of the conversation corresponding to the conversation segment CA 10. Here, the environment input device 102 acquires the commentary being made by the wallflower 144 during the conversation (that corresponds to the time of the conversation segment C 10), and therefore, the dialogue being spoken by the wallflower 144 becomes a conversation segment that becomes part of the next immediately preceding portion of the conversation.

After the wallflower 144 has finished speaking (corresponding to the end of the conversation segment C 10), the second person 146 (S2) begins to speak (corresponding to the conversation segment C 11), as conceptually illustrated in FIG. 4. Because the conversational support system 104 is receiving audio and video information for the ongoing conversation, the conversational support system 104 is creating an ongoing stream of a conversation map (with new conversation segments and/or image based data), as denoted by the conversation segments CS 1 through CS 16 (and beyond).

Since the process of evaluating a series of immediately preceding portions of the conversation is ongoing, a series of conversation queues are generated and presented to the wallflower 144 during the course of the ongoing conversation. FIG. 4 conceptually illustrates a next conversation queue (CQ 2). Here, one skilled in the art appreciates that this next conversation queue (CQ 2) is based on the current subject and/or topic of the ongoing conversation, as represented by the conversation segments CS 10, CS 9, and CS 8 (and even earlier conversation segments). That is, there is some immediately preceding portion of the conversation for with the subject matter of the conversation (the conversation subject and/or topic) is determined, such that supplemental information pertaining to the determined conversation subject and/or topic is located and accessed. Then, the next conversation support information is selected such that the next conversation queue (CQ 2) is generated, is communicated to one or more of the conversation queue output devices 106, and is then presented to the wallflower 144. Accordingly, the wallflower 144 adds their dialogue into the ongoing conversation, as conceptually illustrated by the conversation segment C 12.

Similarly, evaluation of the ongoing conversation map continues such that a continued series of conversation queues are generated. For example, a next conversation queue (CQ 4) is generated based on the current conversation topic determined from the conversation segments CS 14, CS 13, and CS 12 (and even earlier conversation segments).

An unexpected benefit provided by the continuing series of conversation queues that are presented to the wallflower 144 is that, over time, the wallflower 144 is likely to become more confident in their participation in the ongoing conversation. FIG. 4 conceptually illustrates this effect in increased confidence of the wallflower 144 in that the duration of the later dialogue of the wallflower 144 has increased, as indicated by the longer duration of the conversation segment C 12 as compared to the duration of the conversation segment C 10. That is, the wallflower 144 has more that they are willing to say in the ongoing conversation since they have access to the ongoing conversation support information that is provided by the ongoing series of conversation queues.

Another unexpected benefit provided with embodiments of the social interaction facilitator system 100 is that the substance of the dialogue provided by the wallflower 144 can be evaluated and the effectiveness of their dialogue can be assessed. That is, based on a determination of "what" the wallflower 144 has said in a preceding portion of the ongoing conversation (as represented by a conversation segment that is attributed to the wallflower 144), later conversation support information provided in later generated conversation queues can be adapted or modified to further improve the quality of the conversation support information that is provided to the wallflower 144.

For example, after the wallflower 144 has spoken (as conceptually represented by the conversation segment CS 10), the reactions to the commentary provided by the wallflower 144 by the other conversation participants can be evaluated. This information is stored into the conversation queue history database as it is determined by the conversation advisory generator 122.

To illustrate FIG. 4 conceptually illustrates that that after the wallflower 144 has spoken (as conceptually represented by the conversation segment CS 10), the second person 146 (S2) then speaks, followed by the third person 148 (S3). Here, attributes and characteristics of the commentary made by the second person 146 and the third person 148 with respect to the commentary of the wallflower 144 can be assessed. Further, the characteristics and/or attributes of the conversation support information in the conversation queue (CQ 1) can be assessed. Based on an analysis of the conversation support information in the conversation queue (CQ 1), the commentary provided by the wallflower 144 (as conceptually represented by the conversation segment CS 10), and the subsequent commentary made by the second person 146 and the third person 148 (as conceptually represented by the conversation segments CS 11 and CS 12), the effectiveness of the wallflower 144 ability to participate in the ongoing conversation can be determined.

Based on the determined effectiveness of the commentary made by the wallflower 144 (that is based at least in part on a previously presented conversation queue), the nature of subsequently generated conversation queues can be adjusted or modified to improve the effectiveness of further commentary provided by the wallflower 144. To illustrate, assume that the commentary made by the wallflower 144 (as conceptually represented by the conversation segment CS 10) was particularly effective such that the later commentary made by the second person 146 and the third person 148 (as conceptually represented by the conversation segments CS 11 and CS 12) is very responsive to the subject matter of the commentary provided by the wallflower 144. That is, it may be likely that the commentary made by the wallflower 144 may be particularly relevant to the ongoing conversation, and may have invigorated the quality of the ensuing conversation. Accordingly, the next conversation support information provided in the next conversation queue (CQ 2) may build upon and/or enhance the conversation support information provided in the preceding conversation queue (CQ 1).

In contrast, the later commentary from the second person 146 and the third person 148 (as conceptually represented by the conversation segments CS 11 and CS 12) may ignore, or may not pertain to, the commentary provided by the wallflower 144. Here, a determination is made that the preceding commentary made by the wallflower 144 (as conceptually represented by the conversation segment CS 10) is not effective. Accordingly, the next conversation support information provided in the next conversation queue (CQ 2) may be unrelated to the conversation support information provided in the conversation queue (CQ 1). That is, if the conversation support information provided in the conversation queues does not enhance the ability of the wallflower 144 to more meaningfully and actively participate in the ongoing conversation, then the conversation advisory generator 122 can modify or adjust the nature of the information that is being provided to the wallflower 144 in subsequent conversation queues.

Further, one skilled in the art appreciates that the wallflower 144 is not required to use the conversation support information in the ongoing conversation. For example, the conversation support information may be too complicated for the wallflower 144 to comprehend, and accordingly, may not be able to use the presented conversation support information. Alternatively, or additionally, the wallflower 144 may disagree with and/or dislike the presented conversation support information, and accordingly, choose not to use the presented conversation support information. The use of the conversation support information by the wallflower 144 may be determined from later received conversation segments in which the current speaker is the wallflower 144 (or alternatively, if none of the new conversation segments are being spoken by the wallflower 144).

In such situations, embodiments compare the content of the dialogue provided by the wallflower 144 with the content of the previously presented conversation support information. If a determination is made that the conversation support information is too complex, then the complexity of subsequently generated conversation queues may be decreased. Conversely, if a determination is made that the conversation support information is too general in nature, then the complexity of subsequently generated conversation queues may be increased.

Similarly, if a determination is made that the wallflower 144 disagrees with and/or dislikes previously presented conversation support information, then future generated conversation queues may contain conversation support information that is more consistent with the beliefs and/or preferences of the wallflower 144. Conversely, if a determination is made that the wallflower 144 agrees with and/or likes previously presented conversation support information, then future generated conversation queues may contain conversation support information that continues to be consistent with the beliefs and/or preferences of the wallflower 144.

Prior to generating a conversation queue using the selected conversation support information, embodiments must have knowledge about the particular conversation queue output device(s) 106 that are currently being used by the wallflower 144. Once the type of conversation queue output devices 106 are known, then a conversation queue can be generated that is suitable for presentation of the particular conversation queue output devices 106 being used by the wallflower 144.

FIG. 4 conceptually illustrates that a conversation queue CQ 4 is presented just prior to presentation of the conversation queue CQ 3. If the social interaction facilitator system 100 determines that the wallflower 144 is using a type of conversation queue output device 106 that provides a tactile output, such as a vibration device or the like, the conversation queue CQ 4 may be generated and communicated to that particular device. In response to sensing the tactile conversation queue CQ 4, such as when the wallflower 144 feels a vibration being made by the tactile-based conversation queue output device 106, the wallflower 144 intuitively understands that a new conversation queue (CQ 3) is forthcoming. Accordingly, they can direct their attention to the particular one of the conversation queue output devices 106 that will be presenting the conversation support information provided by the incoming conversation queue.

Further, a characteristic of the output of the tactile based conversation queue output device 106 may be modified to indicate to the wallflower 144 with particular one of the conversation queue output devices 106 will be presenting the conversation support information in the incoming conversation queue. For example, a relatively low frequency vibrations may indicate to the wallflower 144 that they should monitor the display 138 on their smart phone 132 for presentation of the visible conversation support information in the incoming conversation queue. A relatively high frequency vibration may indicate to the wallflower 144 that they should listen to the speaker on their ear bud 140 for presentation of the audible conversation support information in the incoming conversation queue.

In some situations where the wallflower 144 is currently using multiple conversation queue output devices 106, a plurality of different conversation queues may be generated using the same conversation support information. However, a format of the data of each one of the plurality of conversation queues would be differently formatted for presentation based on the particular operating characteristics of that particular destination conversation queue output device 106. For example, if the conversation support information is an image or video clip, the format of the data of image or video clip may be different depending upon which particular conversation queue output device 106 is being used. That is, the displays of particular conversation queue output devices 106 may be configured to present image data or video clips using a particular predefined format. Accordingly, once the conversation queue output devices 106 being used by the wallflower 144 are determined, then the format of the data of conversation support information can be formatted in a conversation queue that is suitable for presentation by the intended conversation queue output device 106.

In some situations where the wallflower 144 is using and/or has access to multiple conversation queue output devices 106, the wallflower 144 may optionally specify which particular one of the conversation queue output devices 106 is to be used for presentation of the conversation support information. For example, the wallflower 144 may have access to the hearing aid 130 and the smart phone 132. The wallflower 144 may specify that audible information should be presented using the hearing aid 130, and that image information should be presented on the display 138 of the smart phone 132. Alternatively, or additionally, if conversation support information that can be presented either audibly or as textual information, the wallflower 144 may specify that conversation support information should be presented as textual information on the display 138 of their smart phone 132.

The wallflower 144 may make such specifications regarding preferred conversation queue output devices 106 prior to entering into the conversation, and/or may be made at any time during the ongoing conversation. For example, the wallflower 144 may determine that presenting audible information using their hearing aid 130 is not particularly effective. The wallflower 144 may then specify that the conversation support information should be converted to, or limited to, textual information that is presented on the display 138 or their smart phone 130. Alternatively, or additionally, the wallflower 144 may further specify that the conversation support information should be converted to, or should be limited to, textual information that is also concurrently presented on the display 138 or their smart watch 134. Here, redundant presentation of the conversation support information on multiple devices increases the likelihood that the wallflower 144 will effectively consume the presented conversation support information.

One skilled in the art appreciates that digital type communications are typically communicated over the communication network. Accordingly, the conversation support information is encapsulated into a digital data packet that is communicated to a destination conversation queue output device 106. Accordingly, each conversation queue may be comprised of an ordered sequence of data packets that each contain a portion of the conversation support information.

Figure 5:
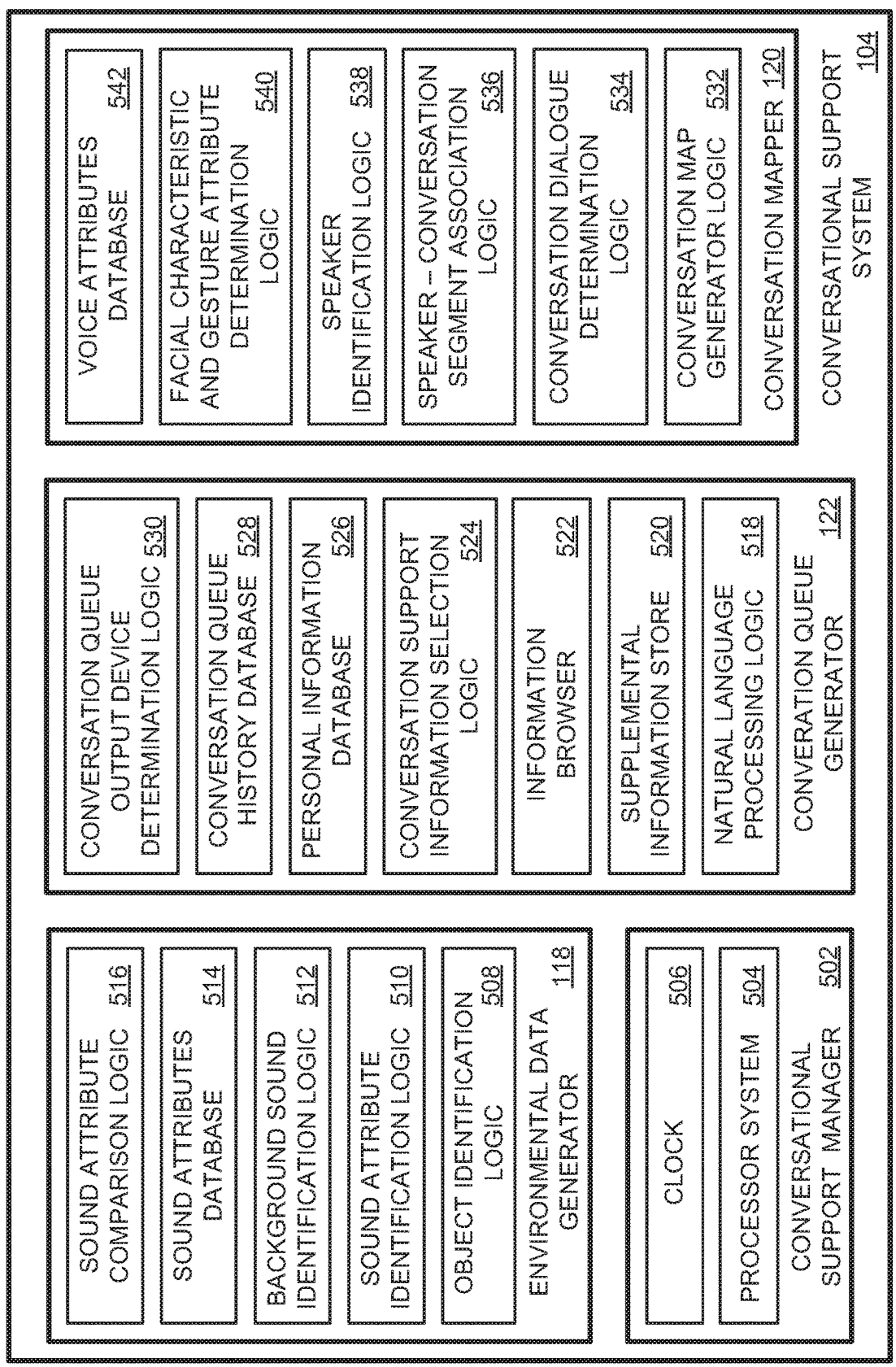
FIG. 5 is a block diagram of a non-limiting example embodiment of a conversational support system.

FIG. 5 is a block diagram of a non-limiting example embodiment of a conversational support system 104. The non-limiting exemplary conversational support system 104 comprises an environmental data generator 118, a conversation mapper 120, a conversation advisory generator 122, and a conversational support manager 502. The conversational support manager 502 comprises a processor system 504 and a clock 506. The environmental data generator 118 comprises object identification logic 508, sound attribute identification logic 510, background sound identification logic 512, sound attributes database 514 and sound attribute comparison logic 516. The conversation advisory generator 122 comprises natural language processing logic 518, supplemental information store 520, information browser 522, conversation support information selection logic 524, personal information database 526, conversation queue history database 528, and conversation queue output device determination logic 530. The conversation mapper 120 comprises conversation map generation logic 532, conversation dialogue determination logic 534, speaker-conversation segment association logic 536, speaker identification logic 538, facial characteristic and gesture attribute determination logic 540, and voice attributes database 542. The conversational support system 104 comprises various memory modules that have portions for storing the information and/or logic identified herein. In some embodiments, the various logic identified herein may be integrated together, and/or may be integrated with other logic. In some embodiments, the information described herein may be stored locally or remotely, may be stored in a plurality of different databases, and/or may be stored with other information. In other embodiments, some or all of these memory and other data manipulation functions may be provided by using a remote server or other electronic devices suitably connected via the Internet or otherwise to a client device. Other conversational support systems 104 may include some, or may omit some, of the above-described media processing components. Further, additional components not described herein may be included in alternative embodiments.

The processor system 504 is typically a commercially available processor. Processor system 504 controls the execution of one or more program modules or logic described herein that are employed by embodiments of the conversational support system 104. Additionally, or alternatively, a plurality of processors may be utilized by embodiments of the processor system 504. Alternatively, or additionally, the processor system 504 may be implemented using a special purpose processor. Furthermore, for convenience of illustration in FIG. 5, processor system 504 and the various logic are shown residing in the conversational support system 104. Processor system 504 and/or the various logic may reside in alternative convenient locations outside of the conversational support system 104, as components of other systems, and/or as stand alone dedicated elements, without adversely affecting the operation and functionality of the social interaction facilitator system 100. Any such alternative embodiments are intended to be within the scope of this disclosure and be protected by the accompanying claims.

Clock 506 provides time information, if needed, to the environmental data generator 118, the conversation mapper 120, and/or the conversation advisory generator 122. The time information may be provided in any suitable time data format such that the conversation segments, image-based data, and/or conversation queues may be time synchronized with each other. Further, the clock 506 may reside in other locations, even in remote locations, depending upon the embodiment. Additionally, or alternatively, time information may be provided by one or more of the environmental input device(s) 102. Additionally, multiple clocks 506 may be used to provide time information, and any time information differences between the multiple clocks 506 may be adjusted accordingly to achieve time synchronization.

The environmental data generator 118 receives image information and audio information from the environmental input device(s) 102, processes the received information, and outputs the series of conversation segments and optional image-based data to the conversation mapper 120. The environmental data generator 118 employs a plurality of logic, modules and/or data to perform these functions.

The object identification logic 508 is any suitable object identification logic now known or later developed. The object identification logic 508 identifies objects, such as conversation participants or other objects (animate and/or inanimate) in the image information still (images and/or video image frames) provided by the camera(s) 108. Information provided by the clock 506 may be optionally used to determine when an object is discernible in the received image information, and/or to synchronize the received image information with the audio information.

The sound attribute identification logic 510 is any suitable sound attribute identification logic now known or later developed. This logic may analyze the frequency characteristics of the audio information provided by the microphone(s) 110 to identify conversation and/or other sounds. Transitions in the identified sound attributes are used by the environmental data generator 118 to identify transitions between speaking conversation participants, and then to generate the conversation segments. Information provided by the clock 506 may be used to determine the start time, end time and/or duration of individual conversation segments, and/or to synchronize the received audio information with the image information.

The sound attributes database 514 stores information corresponding to known unique voice characteristics, such as frequency characteristics of voices, other known sounds, or the like. Preferably, unique voice characteristics associated with the wallflower 144 and/or other conversation participants are known and stored in the sound attributes database 514 such that a speaker in an ongoing conversation segment can be identified.

In some embodiments, the optional sound attribute comparison logic 516 compares the identified characteristics of the discerned voices that are discernible in the received audio information with the known voice characteristics that are stored in the sound attributes database 514. Accordingly, conversation segments may be then associated with a particular speaker of the ongoing conversation who has their voice characteristics that match the identified characteristics of the voices that are discernible in the received audio information. If no match is found with the voice characteristics of a known individual that has been stored in the sound attributes database 514, then the determined voice characteristics are assigned to a predefined alpha-numeric identifier. When that same person later speaks during the ongoing conversation, then that same alpha-numeric identifier can be associated with that particular conversation segment. (At a later time, the individual associated with the alpha-numeric identifier may be optionally determined. However, one skilled in the arts appreciates that the conversation topics can be determined without a determination of the specific individual who has been associated with the alpha-numeric identifier.)

The background sound identification logic 512 is any suitable object identification logic now known or later developed that identifies non-voice sounds in the received audio information. The sound attributes database 514 optionally stores known sound characteristics that are associated with objects that are known to create particular sounds. A discernible sound that has been identified in the audio information can be compared with the stored sound characteristics such that the cause or source of the sounds can be determined. The sound may also be associated with an object that is discernible in the received image information when the time of occurrence of the identified sound corresponds to the time that an object is identified in the image information.

The conversation mapper 120 receives the series of conversation segments and optional image-based data from the environmental data generator 118, processes the received information, and then outputs the conversation map to the conversation advisory generator 122 for the generation of conversation queues. The conversation mapper 120 employs a plurality of logic, modules and/or data to perform these functions.

In some embodiments, the optional voice attributes database 542 contains unique voice attribute information, such as frequency characteristics, that are each associated uniquely with one of a plurality of identified individuals. The optional speaker identification logic 538 compares the voice attributes of each conversation segment with the stored voice attributes in the voice attributes database 542, and when a match between attributes is found, the speaker-conversation segment association logic 536 associates the identity of the individual with the corresponding conversation segment.

The conversation dialogue determination logic 534 is any suitable dialogue identification logic now known or later developed. The conversation dialogue determination logic 534 determines the words of the dialogue of each conversation segment that is received from the environmental data generator 118. Accordingly, the dialogue in each of the conversation segments are reduced to the text of the words of the dialogue being spoken by an identified one of the conversation participants during the ongoing conversation.

In some embodiments, the facial characteristic and gesture attribute determination logic 540 that are identified in the received image information are optionally analyzed to identify various attributes of a conversation participant. Information describing the determined facial characteristic and gesture attributes may be added into the conversation map (along with time information that is associated with the facial characteristic and gesture attribute). The facial characteristic and gesture attribute determination logic 540 is any suitable facial characteristic and/or gesture identification logic now known or later developed.

The conversation advisory generator 122 receives the conversation map from the conversation mapper 120, processes the received information, and outputs series of conversation queues to the wallflower 144. The conversation advisory generator 122 employs a plurality of logic, modules and/or data to perform these functions.

The natural language processing logic 518 is any suitable object identification logic now known or later developed. The natural language processing logic 518 further processes the determined dialogue of each conversation segment, and preferably a plurality of conversation segments in the immediately preceding portion 404 of the conversation, to determine the current conversation subject (interchangeably referred to herein as the conversation topic). That is, the subject matter of the current portion of the ongoing conversation is determined.

Based on the determined current conversation subject matter (the subject and/or the topic), the conversation advisory generator 122 identifies supplemental information stored in the supplemental information store 520 that is pertinent to the determined current conversation subject and/or topic. Alternatively, or additionally, the information browser 522 accesses one or more remote devices, such as an internet site and/or social media platform, to obtain supplemental information that is pertinent to the current conversation subject and/or topic.

The conversation support information selection logic 524 then selects, from the identified supplemental information, conversation support information that is determined to be particularly relevant to the current conversation subject and/or topic. Here, the selected conversation support information is more relevant to the current conversation subject than the non-selected supplemental information. The conversation support information selection logic 524 is any suitable selection logic now known or later developed.

Additionally, the conversation queue output device determination logic 530 identifies the particular one or more conversation queue output devices 106 currently being used by the wallflower 144. The conversation queue output device determination logic 530 is any suitable device identification logic now known or later developed.

Once pertinent conversation support information is identified from the accessed supplemental information, the conversation support information is used to generate a conversation queue. The conversation advisory generator 122 uses the identified and acquired conversation support information to generate a conversation queue that pertains to the immediately preceding portion 404 of the conversation. The format of the data (textual, audio, visual and/or tactile) of the conversation queue is generated based on the particular conversation queue output device(s) 106 currently being used by the wallflower 144 which present the generated conversation queues.

In the various embodiments, the selected conversation support information will be used to generate a conversation queue. The conversation queue generator 122 generates a series of conversation queues that are based upon the selected conversation support information and the identified one or more conversation queue output devices 106. Embodiments of the conversation queue generator 122 construct (synthesize) textual or audio information (depending upon the conversation queue output device(s) 106 currently being used by the wallflower 144). The textual and/or audio information is a description of the selected conversation support information that can be easily understood by the wallflower 144. For example, the selected conversation support information may be a lengthy dissertation related to the identified current conversation subject matter. Here, the conversation queue generator 122 reduces the information to a manageable amount of information that can be presented over a relatively short duration to the wallflower 144. The presented information contains sufficient information about the selected conversation support information so that the wallflower is able to digest and understand the information quickly enough so that the may use the information as part of their input into the ongoing conversation.

The conversation queues may optionally include image information that is based on the image information that is received from the environmental data generator 118, that is stored in the supplemental information store 520, and/or that is accessed from remote devices by the information browser 522. The image information in a presented visual queue is easily understood by the wallflower 144. For example, the selected conversation support information may be a lengthy video related to the identified current conversation subject matter. Here, the conversation queue generator 122 reduces the information to a manageable number of images that can be presented over a relatively short duration to the wallflower 144. The presented image information in a visual queue contains sufficient information so that the wallflower is able to digest and understand the visual information quickly enough so that the may use the information as part of their input into the ongoing conversation.

The various embodiments may also include tactile information that is communicated to one of the conversation queue output device(s) 106 currently being used by the wallflower 144 that is configured to output tactile information. For example, a conversation queue output device 106 may be configured to vibrate. The tactile queue is a signal that causes the vibration portion of the conversation queue output device 106 to vibrate, thus notifying the wallflower 144 that another conversation queue is going to be presented in the near or immediate future. In some embodiments, the tactile queue may be an auditory signal, such as a beep or buss, that is heard by the wallflower 144. Alternatively, or additionally, the tactile queue may be a light signal that causes a display or other light emitting device to output light that is seen by the wallflower 144.

It is appreciated that some short duration 406 (period of time) is required between the identification and acquisition of the supplemental information, selection of the conversation support information from the supplemental information, and the generation/communication/presentation of the conversation queue to the wallflower 144 is required. This relatively short processing duration illustrated in the simplified hypothetical example of FIG. 4. The duration 406 is short enough so that when the conversation support information in the conversation queue is presented to the wallflower 144, the subject matter of the ongoing conversation still pertains to the subject matter of the conversation support information. That is, the conversation support information is always relevant to the subject matter of the current portion of the ongoing conversation.

Further, one skilled in the arts understands that the process of analyzing the immediately preceding portions of the conversation to identify the continually changing subject matter of the ongoing conversation is an ongoing process. That is, even while a first conversation queue is being generated, the ongoing conversation continues to be analyzed so that a next conversation queue can be generated. For example, the stream of conversation queues CQ2 and CQ3 are illustrated in the simplified hypothetical example of FIG. 4. Thus, the wallflower receives a continuing stream of conversation queues that track the subject matter of the ongoing conversation.

Generated conversation queues are stored in the conversation queue history database 528 for later analysis. For example, but not limited to, the effectiveness of the conversation support information and/or previously acquired personal knowledge of the wallflower 144 is determined.

The personal information database 526 may be accessed to obtain personal information about the wallflower 144 and/or other conversation participants to determine particular aspects of the conversation support information. For example, personal information about the wallflower 144 may be used to determine the complexity level of the conversation support information. Alternatively, or additionally, personal information about other conversation participants may be used to determine conversation support information that is pertinent to the other conversation participant (that then informs the wallflower 144 about some characteristic, such as a preference or dislike, of the other conversant participant).

It should be emphasized that the above-described embodiments of the social interaction facilitator system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method that assists a user of a conversational support system to more fully participate in an ongoing conversation, the method comprising:
    receiving, at the conversational support system, a stream of audio information from at least one microphone, wherein the audio information includes a dialogue of the ongoing conversation occurring between a user of the conversational support system and a plurality of other conversation participants;
    identifying, at the conversational support system, sound characteristics in the stream of audio information;
    identifying, at the conversational support system, a transition in the sound characteristics from a first sound characteristic to a second sound characteristic, wherein the first sound characteristic corresponds to dialogue being spoken by a first conversation participant, and wherein the second sound characteristic corresponds to dialogue being spoken by a second conversation participant;
    generating, at the conversational support system, a conversation map comprising a plurality of conversation segments from the received stream of audio information, wherein each conversation segment is identifiable based on one of the first sound characteristic and the second sound characteristic, and wherein each conversation segment is associated with one of the first conversation participant when the conversation segment has the first sound characteristic or the second conversation participant when the conversation segment has the second sound characteristic;
    determining, at the conversational support system, a subject matter of a current portion of the ongoing conversation based on the dialogue of at least one conversation segment that is in an immediately preceding portion of the ongoing conversation;
    accessing a plurality of supplemental information, wherein each of the accessed plurality of supplemental information pertains to the determined subject matter of the current portion of the ongoing conversation;
    selecting, at the conversational support system, conversation support information from the accessed plurality of supplemental information, wherein the conversation support information is more relevant to the current conversation subject than the non-selected plurality of supplemental information;
    generating, at the conversational support system, a first conversation queue that includes information that corresponds to the selected conversation support information;
    communicating the generated first conversation queue from the conversational support system to at least one conversation queue output device that presents the conversation support information to the user;
    receiving, at the conversational support system, a stream of image information from at least one camera, wherein the image information is received concurrently with the received audio information;
    identifying an object in at least one image of the received image information, wherein the object is a person who is currently speaking the dialogue of the current conversation segment;
    identifying the speaking person, wherein the speaking person is identified by their unique identity information;
    associating a current conversation segment with the identity of the speaking person;
    identifying, in the stream of image information, a gesture or a facial expression being made by the identified speaking person;
    generating, at the conversational support system, a second conversation queue that describes the gesture of the facial expression being made by the identified speaking person; and
    communicating the generated second conversation queue from the conversational support system to at least one conversation queue output device that presents the supplemental information that pertains to the identified speaking person.

2. The method of claim 1, wherein the conversation queue output device comprises a speaker, and wherein the conversation support information is audible information that is emitted by the speaker and that is heard by the user of the conversation queue output device.

3. The method of claim 1, wherein the conversation queue output device comprises a display, and wherein the conversation support information is textual information that is presented on the display and that is seen by the user of the conversation queue output device.

4. The method of claim 1, wherein the conversation queue output device comprises a display, and wherein the conversation support information is image information that is presented on the display and that is seen by the user of the conversation queue output device.

5. The method of claim 1, wherein generating the plurality of conversation segments from the received stream of audio information comprises:
ending a current conversation segment in response to determining the transition in the sound characteristics from the first sound characteristic to the second sound characteristic; and
beginning a next conversation segment in response to determining the transition in the sound characteristics from the first sound characteristic to the second sound characteristic.

6. The method of claim 5, further comprising:
associating an ending time that identifies the ending of the current conversation segment with the current conversation segment; and
associating a start time that identifies the beginning of the next conversation segment with the next conversation segment.

7. The method of claim 1, wherein determining the subject matter of a current portion of an ongoing conversation based on the dialogue of at least one conversation segment in an immediately preceding portion of the conversation further comprises:
determining words of the dialogue being spoken by a conversation participant during the at least one conversation segment; and
processing the determined words of the dialogue to identify the subject matter of the current portion of an ongoing conversation.

8. The method of claim 1, wherein the plurality of supplemental information is a second plurality of supplemental information, and wherein accessing the plurality of supplemental information that pertains to the determined subject matter of the current portion of the conversation further comprises:
determining at least one keyword that characterizes the determined subject matter of the current portion of the conversation;
comparing the determined at least one keyword with keywords of each one of a first plurality of supplemental information that is stored in a memory medium of the conversational support system; and
selecting the second plurality of supplemental information from the first plurality of supplemental information when the keyword of one of the first plurality of supplemental information matches the at least one keyword that characterizes the determined subject matter of the current portion of the conversation.

9. The method of claim 1, wherein the plurality of supplemental information is a second plurality of supplemental information, and wherein accessing the plurality of supplemental information that pertains to the determined subject matter of the current portion of the conversation further comprises:
determining at least one keyword that characterizes the determined subject matter of the current portion of the conversation;
communicating the at least one keyword that characterizes the determined subject matter of the current portion of the conversation from the conversational support system to a remote site via a communication network, wherein the remote site compares the determined at least one keyword with keywords associated with each one of a first plurality of supplemental information that is stored in a memory medium of the remote site, and wherein the remote site selects the second plurality of supplemental information from the first plurality of supplemental information when the keyword of one of the first plurality of supplemental information matches the at least one keyword that characterizes the determined subject matter of the current portion of the conversation; and
receiving, at the conversational support system, the second plurality of supplemental information from the remote site.

10. The method of claim 1, wherein prior to generating the first conversation queue that includes information that corresponds to the selected conversation support information, the method further comprises:
identifying the at least one conversation queue output device that is being used by the user,
wherein a format of data of the generated first conversation queue is formatted to be presented by the at least one identified conversation queue output device that is being used by the user.

11. The method of claim 10, wherein generating the first conversation queue that includes information that corresponds to the selected conversation support information further comprises:
determining that the at least one conversation queue output device being used by the user includes a display; and
identifying at least one of a still image or a video clip that pertains the selected conversation support information,
wherein the first conversation queue includes the selected at least one still image or video clip, and
wherein the at least one still image or video clip is presented as image information to the user on the display of the at least one conversation queue output device that is being used by the user.

12. The method of claim 10, wherein generating the first conversation queue that includes information that corresponds to the selected conversation support information further comprises:
determining that the at least one conversation queue output device being used by the user includes a display;
identifying a plurality of words that describe the selected conversation support information; and
converting the identified words into textual information,
wherein the first conversation queue includes the textual information, and
wherein the textual information is presented as text to the user on the display of the at least one conversation queue output device that is being used by the user.

13. The method of claim 10, wherein generating the first conversation queue that includes information that corresponds to the selected conversation support information further comprises:
determining that the at least one conversation queue output device being used by the user includes a speaker;
identifying a plurality of words that describe the selected conversation support information; and
converting the identified words into audio information,
wherein the first conversation queue includes the audio information, and wherein the audio information is presented as spoken words to the user from a speaker of the at least one conversation queue output device that is being used by the user.

14. The method of claim 1, further comprising:
accessing supplemental information that pertains to the identified speaking person;
generating, at the conversational support system, a third conversation queue that includes personal information that pertains to the identified speaking person; and
communicating the generated third conversation queue from the conversational support system to at least one conversation queue output device that presents the personal information that pertains to the identified speaking person.

15. The method of claim 1, wherein the received audio information includes a background sound that is not part of the dialogue of the ongoing conversation, the method further comprising:
identifying the background sound;
determining an attribute of the background sound;
comparing the attribute of the background sound with at least one attribute that is associated with each one of a plurality of objects that are known to create a particular sound;
identifying an object from the plurality of objects, wherein at least one attribute of the identified object is the same as the attribute of the identified background sound;
determining that the identified object has caused the background sound;
generating, at the conversational support system, a third conversation queue that identifies the object that caused the background sound; and
communicating the generated third conversation queue from the conversational support system to at least one conversation queue output device that presents information that pertains to the identified object that caused the background sound to the user.

16. The method of claim 1, wherein the received audio information includes a background sound that is not part of the dialogue of the ongoing conversation, further comprising:
identifying the background sound;
determining an attribute of the background sound;
identifying a time that the background sound occurred;
selecting an image from the received stream of image information, wherein the selected image was acquired at the same time that the background sound occurred;
identifying an object in the selected image;
accessing sound attributes that describe sounds known to be caused by the identified object;
comparing the sound attributes that describe sounds known to be caused by the identified object with the attributes of the identified background sound;
determining that the identified object has caused the background sound when the sound attributes associated with the identified object match the attributes of the identified background sound;
generating, at the conversational support system, a third conversation queue that identifies the object that caused the background sound; and
communicating the generated third conversation queue from the conversational support system to at least one conversation queue output device that presents information that pertains to the identified object that caused the background sound to the user.

17. A method that assists a user of a conversational support system to more fully participate in an ongoing conversation, the method comprising:
receiving a conversation map comprising a serially arranged plurality of conversation segments of audio information, wherein each conversation segment is identifiable based on ene-a sound characteristic that is associated with one of a plurality of conversation participants, and wherein each conversation segment includes dialogue of the ongoing conversation being spoken by the associated conversation participant;
determining subject matter of a current portion of the ongoing conversation based on the dialogue of a currently received conversation segment;
selecting conversation support information that pertains to the current conversation subject;
generating, at the conversational support system, a first conversation queue that includes information that corresponds to the selected conversation support information, wherein the first conversation queue is communicated from the conversational support system to at least one conversation queue output device that presents the conversation support information to the user;
receiving, at the conversational support system, a stream of image information from at least one camera, wherein the image information is received concurrently with the received audio information;
identifying an object in at least one image of the received image information, wherein the object is a person who is currently speaking the dialogue of the current conversation segment;
identifying the speaking person, wherein the speaking person is identified by their unique identity information; and
associating a current conversation segment with the identity of the speaking person;
identifying, in the stream of image information, a gesture or a facial expression being made b the identified speaking person;
generating, at the conversational support system, a second conversation queue that describes the gesture of the facial expression being made by the identified speaking person; and
communicating the generated second conversation queue from the conversational support system to at least one conversation queue output device that presents the supplemental information that pertains to the identified speaking person.

18. A method of claim 17, further comprising:
receiving, at the conversational support system, a stream of audio information from at least one microphone that is acquiring the dialogue of the ongoing conversation.

19. A method that assists a user of a conversational support system to more fully participate in an ongoing conversation, the method comprising:
receiving a conversation map comprising a serially arranged plurality of conversation segments of audio information, wherein each conversation segment is identifiable based on a sound characteristic that is associated with one of a plurality of conversation participants, and
wherein each conversation segment includes dialogue of the ongoing conversation being spoken by the associated conversation participant;
determining subject matter of a current portion of the ongoing conversation based on the dialogue of a currently received conversation segment;

selecting conversation support information that pertains to the current conversation subject; and generating, at the conversational support system, a first conversation queue that includes information that corresponds to the selected conversation support information, wherein the first conversation queue is communicated from the conversational support system to at least one conversation queue output device that presents the conversation support information to the user;

wherein the received audio information includes a background sound that is not part of the dialogue of the ongoing conversation, further comprising:

identifying the background sound;
determining an attribute of the background sound;
identifying a time that the background sound occurred;
selecting an image from the received stream of image information, wherein the selected image was acquired at the same time that the background sound occurred;
identifying an object in the selected image;
accessing sound attributes that describe sounds known to be caused by the identified object;
comparing the sound attributes that describe sounds known to be caused by the identified object with the attributes of the identified background sound;
determining that the identified object has caused the background sound when the sound attributes associated with the identified object match the attributes of the identified background sound;
generating, at the conversational support system, a second conversation queue identifying the object that caused the background sound; and
communicating the generated second conversation queue from the conversational support system to at least one conversation queue output device that presents information that pertains to the identified object that caused the background sound to the user.

* * * * *

UNITED STATES PATENT AND TRADEMARK OFFICE
CERTIFICATE OF CORRECTION

PATENT NO. : 11,017,001 B2
APPLICATION NO. : 16/237126
DATED : May 25, 2021
INVENTOR(S) : Nicholas Newell et al.

Page 1 of 1

It is certified that error appears in the above-identified patent and that said Letters Patent is hereby corrected as shown below:

In the Claims

Claim 17, Column 38, Line 38, after "made" please change "b" to --by--.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*